US011297329B2

(12) United States Patent
Kusakabe et al.

(10) Patent No.: US 11,297,329 B2
(45) Date of Patent: Apr. 5, 2022

(54) IMAGE ENCODING METHOD, TRANSMISSION METHOD, AND IMAGE ENCODER

(71) Applicant: Panasonic Intellectual Property Management Co., Ltd., Osaka (JP)

(72) Inventors: Toshihiko Kusakabe, Osaka (JP); Shinji Kitamura, Kyoto (JP); Kiyofumi Abe, Osaka (JP); Hideyuki Ohgose, Osaka (JP); Takashi Hashimoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/382,919

(22) Filed: Apr. 12, 2019

(65) Prior Publication Data
US 2019/0238855 A1    Aug. 1, 2019

Related U.S. Application Data

(63) Continuation of application No. PCT/JP2017/036745, filed on Oct. 11, 2017.

(30) Foreign Application Priority Data

Oct. 18, 2016  (JP) ................................ 2016-204533

(51) Int. Cl.
*H04N 19/146*    (2014.01)
*H04N 19/176*    (2014.01)
(Continued)

(52) U.S. Cl.
CPC ......... *H04N 19/146* (2014.11); *H04N 19/119* (2014.11); *H04N 19/15* (2014.11);
(Continued)

(58) Field of Classification Search
None
See application file for complete search history.

(56) References Cited

U.S. PATENT DOCUMENTS 8,144,789 B2 *  3/2012  Tasaka ................. H04N 19/172
                                              345/589
9,066,103 B2 *  6/2015  Shimizu ................. H04N 19/15
(Continued)

FOREIGN PATENT DOCUMENTS

| JP | 2003-209837 | 7/2003 |
| JP | 2009-038746 | 2/2009 |
| JP | 2010-278730 | 12/2010 |

OTHER PUBLICATIONS

International Search Report (ISR) dated Jan. 16, 2018 in International (PCT) Application No. PCT/JP2017/036745.
(Continued)

*Primary Examiner* — Mohammad J Rahman
(74) *Attorney, Agent, or Firm* — Wenderoth, Lind & Ponack, L.L.P.

(57) ABSTRACT

Provided is an image encoding method which inhibits deterioration in processing performance for encoding while improving transmission efficiency. The image encoding method is for generating a bitstream by encoding a picture, and includes: sequentially encoding blocks included in the picture; deriving an encoding amount of a slice segment each time one of the blocks is encoded as a current block, the slice segment including the current block; determining whether the encoding amount derived is at least a threshold; and setting end information indicating an end of the slice segment in a position in the bitstream when the encoding amount is determined to be at least the threshold, the position corresponding to the current block encoded.

10 Claims, 21 Drawing Sheets

(51) Int. Cl.
*H04N 19/174* (2014.01)
*H04N 19/119* (2014.01)
*H04N 19/15* (2014.01)
*H04N 19/169* (2014.01)

(52) U.S. Cl.
CPC ......... *H04N 19/174* (2014.11); *H04N 19/176* (2014.11); *H04N 19/188* (2014.11)

(56) References Cited

U.S. PATENT DOCUMENTS

| | | | |
|---|---|---|---|
| 9,313,514 B2 | 4/2016 | Misra et al. | |
| 9,749,661 B2* | 8/2017 | Wang | H04N 19/90 |
| 2004/0062313 A1* | 4/2004 | Schoenblum | H04N 19/124 375/240.25 |
| 2004/0190609 A1 | 9/2004 | Watanabe | |
| 2008/0025396 A1* | 1/2008 | Tasaka | H04N 19/172 375/240.12 |
| 2008/0170615 A1* | 7/2008 | Sekiguchi | H04N 19/70 375/240.14 |
| 2008/0285657 A1* | 11/2008 | Fu | H04N 19/176 375/240.24 |
| 2008/0288518 A1* | 11/2008 | Matsuo | H04N 19/159 |
| 2008/0310745 A1* | 12/2008 | Ye | H04N 19/157 382/238 |
| 2009/0028427 A1* | 1/2009 | Yamada | H04N 21/236 382/166 |
| 2009/0174819 A1* | 7/2009 | Koike | H04N 19/159 348/699 |
| 2009/0263032 A1* | 10/2009 | Tanaka | H04N 19/117 382/233 |
| 2009/0263036 A1* | 10/2009 | Tanaka | H04N 19/14 382/251 |
| 2009/0267812 A1* | 10/2009 | Chen | H04N 19/61 341/67 |
| 2010/0260269 A1* | 10/2010 | He | H04N 19/159 375/240.27 |
| 2010/0303153 A1* | 12/2010 | Kadono | H04N 19/61 375/240.13 |
| 2011/0001839 A1* | 1/2011 | Arimura | H04N 19/597 348/222.1 |
| 2011/0078372 A1* | 3/2011 | Gladwin | G06F 11/1076 711/114 |
| 2012/0082218 A1* | 4/2012 | Misra | H04N 19/197 375/240.12 |
| 2012/0106624 A1* | 5/2012 | Huang | H04N 19/86 375/240.02 |
| 2012/0183058 A1* | 7/2012 | Desappan | H04N 19/91 375/240.12 |
| 2012/0281768 A1* | 11/2012 | Matsuba | H04N 19/91 375/240.24 |
| 2012/0300836 A1* | 11/2012 | Shimizu | H04N 19/15 375/240.08 |
| 2013/0010864 A1* | 1/2013 | Teng | H04N 19/152 375/240.12 |
| 2013/0034300 A1* | 2/2013 | Ben-David | H04N 19/625 382/166 |
| 2013/0170557 A1* | 7/2013 | Wang | G06T 7/11 375/240.24 |
| 2013/0343458 A1* | 12/2013 | Miyoshi | H04N 19/52 375/240.16 |
| 2014/0072035 A1* | 3/2014 | Rabii | H04N 5/147 375/240.03 |
| 2014/0307775 A1* | 10/2014 | Ouedraogo | H04N 19/159 375/240.02 |
| 2015/0110118 A1* | 4/2015 | Ouedraogo | H04L 65/00 370/394 |
| 2015/0222909 A1* | 8/2015 | Rutz | H04N 19/167 375/240.02 |
| 2016/0227244 A1* | 8/2016 | Rosewarne | H04N 19/105 |
| 2019/0166180 A1* | 5/2019 | Zhao | H04N 19/126 |
| 2019/0200044 A1* | 6/2019 | Galpin | H04N 19/463 |

OTHER PUBLICATIONS

Sakae Okubo, "H. 265/HEVC Textbook," Impress Japan Corporation, Oct. 2013, pp. 206-208 (with partial English translation and cited in the specification).

T. Schierl, et al., "Dependent slices support in HEVC mam profile", Joint Collaborative Team on Video Coding (JCT-VC) of ITU-T SG16 WP3 and ISO/IEC JTC1/SC29/WG11, JCTVC-J0264, 10th Meeting: Stockholm, SE, Jul. 2012, pp. 1-4.

Extended European Search Report dated Oct. 9, 2019 in corresponding European Patent Application No. 17862358.3.

H. Hadizadeh et al., "NAL-SIM: An Interactive Simulator for H.264/AVC Video Coding and Transmission", Consumer Communications and Networking Conference (CCNC), 2010 7th IEEE, Jan. 9, 2010, pp. 1-2.

* cited by examiner

IMAGE ENCODING METHOD, TRANSMISSION METHOD, AND IMAGE ENCODER

CROSS REFERENCE TO RELATED APPLICATIONS

This application is a U.S. continuation application of PCT International Patent Application Number PCT/JP2017/036745 filed on Oct. 11, 2017, claiming the benefit of priority of Japanese Patent Application Number 2016-204533 filed on Oct. 18, 2016, the entire contents of which are hereby incorporated by reference.

BACKGROUND

1. Technical Field

The present disclosure relates to an image encoding method and an image encoder which generate a bitstream by encoding a picture, and a transmission method for transmitting the generated bitstream.

2. Description of the Related Art

Now, the High Efficiency Video Coding (HEVC) method (see Non-Patent Literature (NPL) 1: Okubo, Sakae, et al. "H. 265/HEVC Textbook", Impress Japan, 2013) has been provided as a new image encoding standard. This standard specifies, for instance, an image encoding method for splitting a picture into a plurality of slices and encoding the picture, and a picture decoding method for decoding the encoded picture.

SUMMARY

However, the image encoding method according to NPL 1 has a problem that the processing performance for encoding deteriorates if the efficiency of transmitting a bitstream generated by encoding is to be improved.

In view of the above, the present disclosure provides, for instance, an image encoding method which inhibits deterioration in processing performance for encoding while improving transmission efficiency.

An image encoding method according to an aspect of the present disclosure is an image encoding method for generating a bitstream by encoding a picture, the image encoding method including: sequentially encoding blocks included in the picture; deriving an encoding amount of a slice segment each time one of the blocks is encoded as a current block, the slice segment including the current block; determining whether the encoding amount derived is at least a threshold; and setting end information indicating an end of the slice segment in a position in the bitstream when the encoding amount is determined to be at least the threshold, the position corresponding to the current block encoded.

Note that these general and specific aspects may be implemented using a system, a method, an integrated circuit, a computer program, a computer-readable recording medium such as a CD-ROM, or any combination of systems, methods, integrated circuits, computer programs, or recording media.

The image encoding method according to the present disclosure can inhibit deterioration in processing performance for encoding while improving transmission efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Underlying Knowledge Forming Basis of the Present Disclosure

The inventors of the present disclosure have found that the image encoding method disclosed by NPL 1 stated in the "background art" section has problems as below.

Figure 1A:
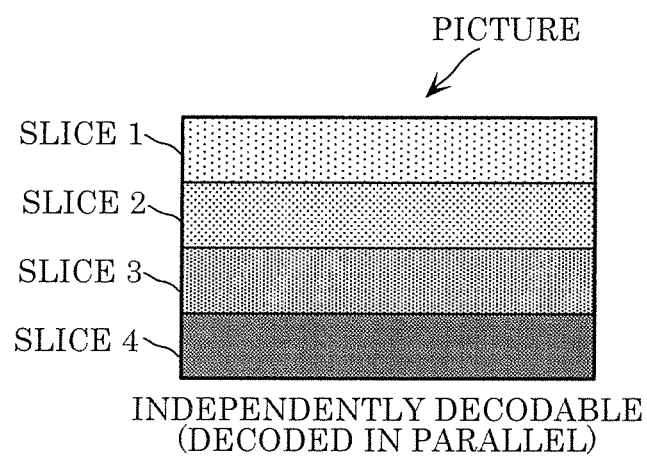
FIG. 1A illustrates examples of slices included in a picture.

FIG. 1A illustrates examples of slices included in a picture.

A picture includes a plurality of slices, as illustrated in FIG. 1A. Prediction is not performed over a slice boundary, for instance, when such slices are encoded. Hence, intra prediction or calculation of a motion vector predictor is not performed for a slice that is to be encoded (hereinafter referred to as a current slice) using a slice other than the current slice. Accordingly, the image decoding device can decode encoded slices independently. Thus, the image decoding device can decode such encoded slices in parallel.

Figure 1B:
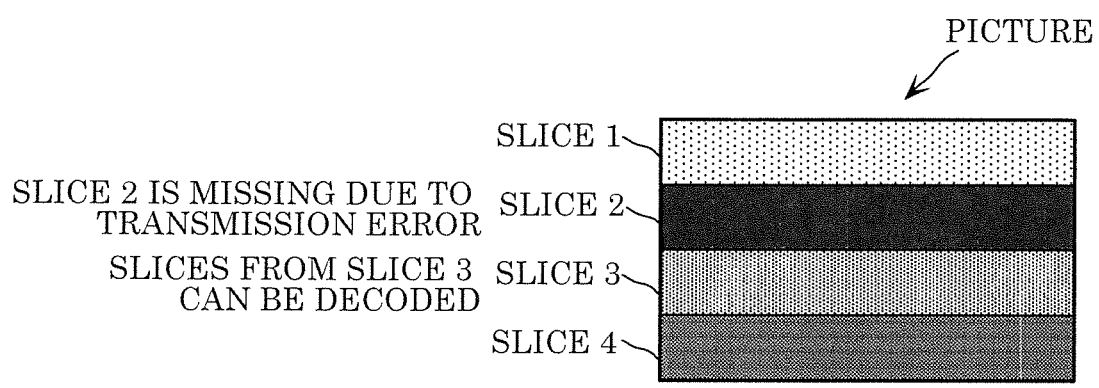
FIG. 1B is a diagram for describing error resistance achieved by slices.

FIG. 1B is a diagram for describing error resistance achieved by slices.

As mentioned above, the encoded slices can be decoded independently, and thus even if one of the slices is missing, the image decoding device can decode the other slices as illustrated in FIG. 1B. For example, assume the case in which the image decoding device decodes slice 1 included in a picture, and thereafter an error in transmitting subsequent slice 2 arises. At this time, the image decoding device cannot decode slice 2, but can appropriately decode slices subsequent to slice 2, including slice 3.

Figure 2A:
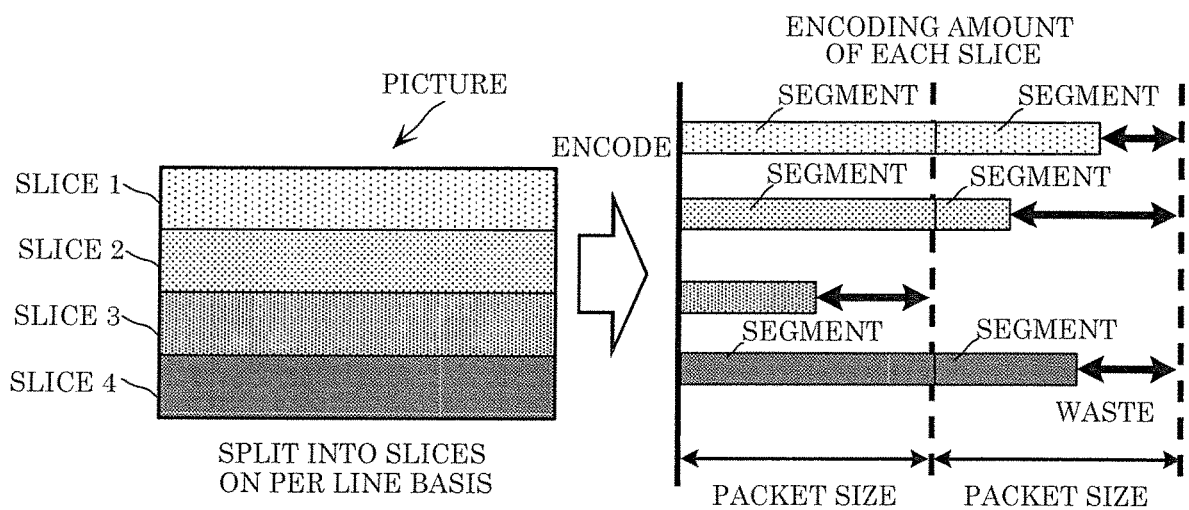
FIG. 2A is a diagram for describing network transmission of slices.

FIG. 2A is a diagram for describing network transmission of slices.

For example, a picture is split into a plurality of lines as illustrated in FIG. 2A. The lines are each constituted as a slice. Note that each line includes blocks (specifically CTUs: coding tree units) linearly disposed in the horizontal direction of the picture.

When such slices as mentioned above are transmitted through a network, a slice having a large encoding amount is split according to a packet size. Thus, a slice having an encoding amount that exceeds the maximum transmission unit (MTU) value is split into a plurality of segments each having an encoding amount of at most the MTU value. The segments are each stored in a packet and transmitted. Note that the MTU value is 1500 bytes in the case of Ethernet (registered trademark).

However, when splitting a slice in such a manner, a packet often has a waste as illustrated in FIG. 2A. For example, if segments of two different slices are stored in a single packet, the two slices cannot be decoded once the single packet is lost. Accordingly, segments of two different slices cannot be stored in a single packet. Accordingly, if a segment has a small encoding amount, a packet which stores the segment has large unused space, which is a waste.

In view of this, it is conceivable to split a picture into a plurality of slices according to the encoding amounts.

Figure 2B:
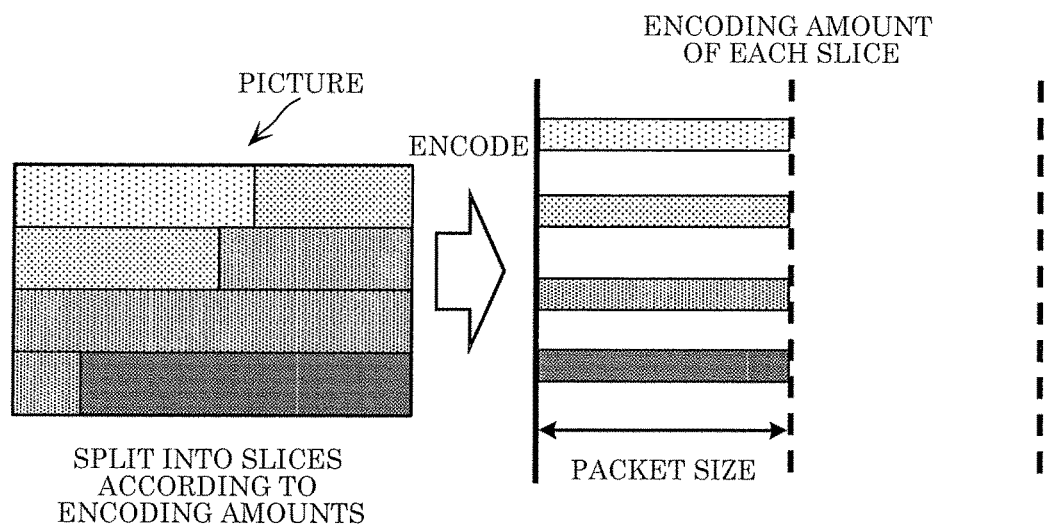
FIG. 2B illustrates an example in which a picture is split into a plurality of slices according to encoding amounts.

FIG. 2B illustrates an example in which a picture is split into a plurality of slices according to the encoding amounts.

For example, as illustrated in FIG. 2B, if a picture is split into a plurality of slices each having the encoding amount the same as an MTU value, the space of a packet can be effectively used, and the slices can be stored in packets and transmitted while inhibiting a waste from being generated.

However, if a picture is split into a plurality of slices according to the encoding amounts, a problem arises that processing performance for encoding deteriorates, although waste in transmission can be inhibited.

Figure 3A:
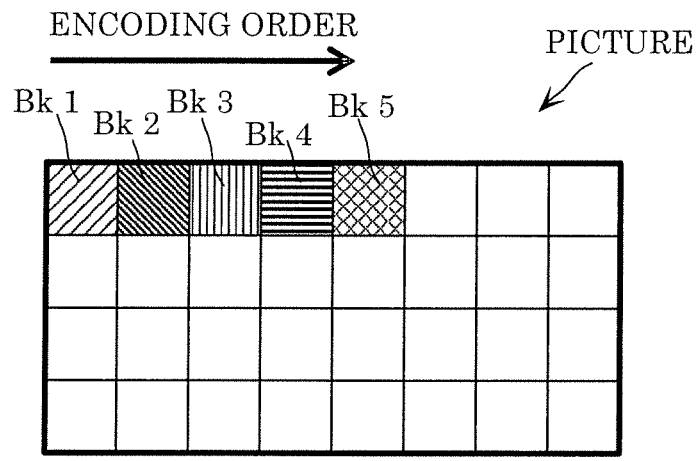
FIG. 3A illustrates the encoding order in which blocks are encoded, to describe pipeline processing.
Figure 3B:
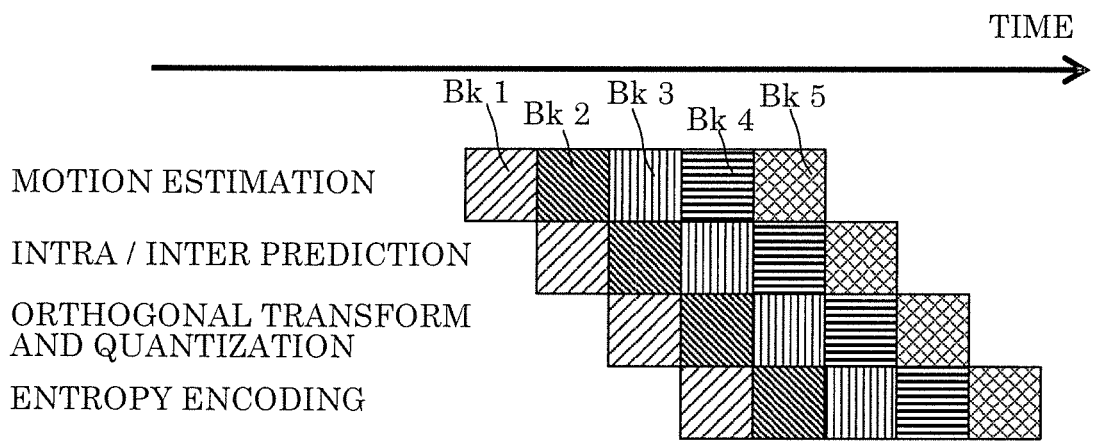
FIG. 3B is a diagram for describing pipeline processing.

FIGS. 3A and 3B are diagrams for describing pipeline processing.

For example, as illustrated in FIG. 3A, blocks (specifically, CTUs) included in a picture are encoded in the raster scan order, for example. Specifically, the blocks are encoded in the order of blocks Bk1, Bk2, Bk3, Bk4, and Bk5.

As illustrated in FIG. 3B, this encoding includes motion estimation, prediction (intra prediction or inter prediction), orthogonal transform and quantization, and entropy encoding. Specifically, each of the blocks is subjected to motion estimation, then prediction, then orthogonal transform and quantization, and after that, entropy encoding. In pipeline processing, motion estimation is performed on block Bk1, and when prediction is performed on block Bk1, motion estimation is performed on next block Bk2. Then, when orthogonal transform and quantization are performed on block Bk1, prediction is performed on next block Bk2, and furthermore motion estimation is performed on next block Bk3. The processing performance for encoding can be improved by such pipeline processing.

However, as illustrated in FIG. 2B, when a picture is split into a plurality of slices according to the encoding amounts, the pipeline processing as described above cannot be appropriately performed, and processing performance may deteriorate.

Figure 4:
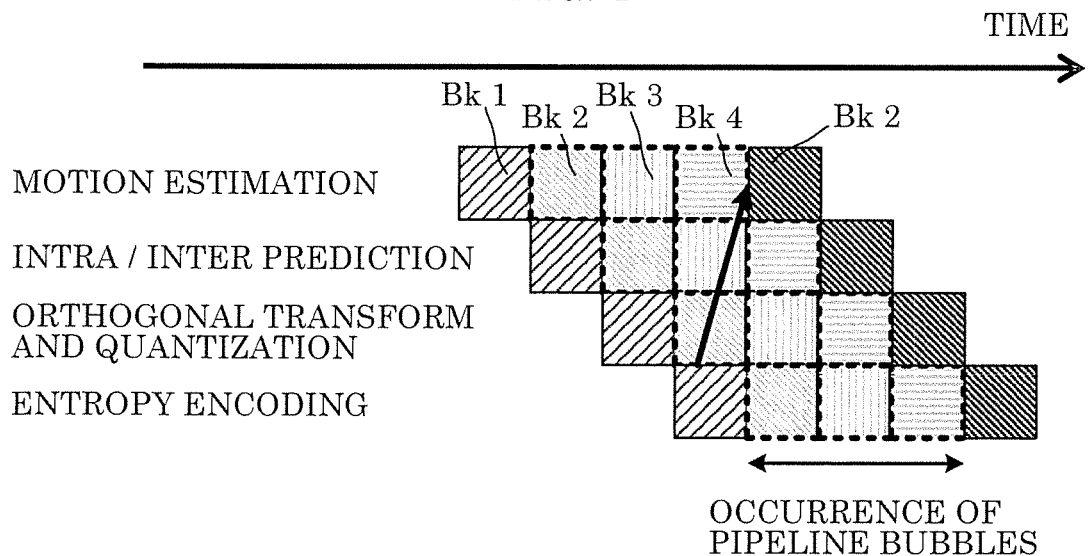
FIG. 4 illustrates an example of a state in which pipeline processing is not appropriately performed.

FIG. 4 illustrates an example of a state in which pipeline processing is not appropriately performed.

In order to split a picture into a plurality of slices according to the encoding amounts, the encoding amount of each slice needs to have a value that is at most the MTU value, and the encoding amount of the slice corresponds to an integrated value of the encoding amounts of blocks included in the slice. The encoding amount of a block is determined by entropy encoding in the last stage of the pipeline processing. Accordingly, for example, entropy encoding is performed on block Bk1 so that the encoding amount of block Bk1 is determined, and as a result, the encoding amount of a slice that includes block Bk1 may reach the MTU value. At this time, block Bk2 subsequent to block Bk1 is not included in the slice that includes block Bk1, and is included in the subsequent slice. Here, different processes such as motion estimation and prediction are performed on different slices. Accordingly, it is necessary to perform, on block Bk2 included in the subsequent slice, a process such as motion estimation or prediction, which is different from the process performed on the slice that includes block Bk1. However, in the pipeline processing, the same processing as that performed on the slice that includes block Bk1 has already been performed on block Bk2. As a result, encoding must be performed again on block Bk2 from motion estimation. Accordingly, wasteful processing (so-called pipeline bubbles) in pipeline processing occurs. This causes problems that a delay in encoding and an increase in a processing burden arise, resulting in deterioration in processing performance.

In order to address such a problem, an image encoder according to an aspect of the present disclosure is an image encoding method for generating a bitstream by encoding a picture, the image encoding method including: sequentially encoding blocks included in the picture; deriving an encoding amount of a slice segment each time one of the blocks is encoded as a current block, the slice segment including the current block; determining whether the encoding amount derived is at least a threshold; and setting end information indicating an end of the slice segment in a position in the bitstream when the encoding amount is determined to be at least the threshold, the position corresponding to the current block encoded. For example, the slice segment is one of an independent slice segment and at least one dependent slice segment which depends on the independent slice segment, the independent slice segment and the at least one dependent slice segment being included in a slice included in the picture. For example, the threshold is a numerical value of at most a size of a packet used for network transmission of the bitstream. Further, a block is a CTU, for example.

Accordingly, each time a block is encoded, the encoding amount of a slice segment is derived, and the end of the slice segment is set when the encoding amount is at least the threshold. Thus, a picture can be split into a plurality of slice segments each having an intended encoding amount. Specifically, the unused space in a packet is reduced, and one slice segment can be stored in the packet. As a result, wasteful unused space in a packet can be reduced, and efficiency of network transmission can be improved.

Further, each of the slice segments is one of an independent slice segment and a dependent slice segment, and one slice segment can be referred to encode another slice segment. Thus, according to the encoding amount of a slice segment derived by encoding a block and irrespective of whether the block is the last block of the slice segment, encoding a subsequent block can be started with reference to another slice segment. Accordingly, in a series of pipeline processing for encoding performed in the order of motion estimation, prediction, orthogonal transformation and quantization, and entropy encoding, processes such as motion estimation already performed on a subsequent block with reference to another slice segment can be prevented from being performed again after the last block included in a slice segment is encoded. As a result, deterioration in processing performance for encoding can be inhibited.

The image encoding method may further include: determining whether the number of encoded blocks included in the slice segment the encoding amount of which has been derived among the blocks is at least a minimum block count predetermined. In determining whether the encoding amount derived is at least the threshold, whether the encoding amount derived is at least the threshold may be determined when the number of the encoded blocks is at least the minimum block count.

Accordingly, when the number of encoded blocks included in a slice segment is lower than a minimum block count, the end of the slice segment is not set, and thus the number of blocks included in the slice segment can be increased to at least the minimum block count. Accordingly, for example, slice segments the number of which is at most the number in accordance with the HEVC standard can be generated.

The image encoding method may further include: determining, when the encoding amount derived is determined to be lower than the threshold, whether the number of encoded blocks included in the slice segment the encoding amount of which has been derived among the blocks is at least a maximum block count predetermined; and setting, when the number of the encoded blocks is determined to be at least the maximum block count, the end information indicating the end of the slice segment in the position in the bitstream, the position corresponding to the current block encoded.

Accordingly, even if the encoding amount of a slice segment is lower than the threshold, if the number of blocks included in the slice segment is at least the maximum block count, the end of the slice segment is set. Accordingly, the number of blocks included in the slice segment can be limited to at most the maximum block count, and thus a picture can be split into slice segments the number of which is at least the optimal number. The optimal number is 4, for example. Accordingly, the image decoder can decode the four slice segments in parallel.

Sequentially encoding the blocks may include binarization and arithmetic encoding, and in deriving the encoding amount of the slice segment, the encoding amount of the slice segment may be derived using an amount of binarized data of the current block on which the binarization has been performed and the arithmetic encoding has not been performed yet. For example, in deriving the encoding amount of the slice segment, an encoding amount of the current block on which the arithmetic encoding has been performed may be estimated from the amount of the binarized data, and the encoding amount of the slice segment may be derived using the estimated encoding amount of the current block.

Accordingly, before the arithmetic encoding on a current block is completed, the encoding amount of a slice segment can be derived using the amount of data of the current block. Thus, encoding processing can be accelerated. Further, the arithmetic encoding which takes a comparatively long process time can be excluded from pipeline processing.

The image encoding method may further include: determining whether the number of encoded blocks included in the slice segment the encoding amount of which has been derived among the blocks is at least an upper limit block count, when the encoding amount derived is determined to be lower than the threshold; setting the end information indicating the end of the slice segment in the position in the bitstream when the number of the encoded blocks is determined to be at least the upper limit block count, the position corresponding to the current block encoded; and updating the upper limit block count according to a slice segment block count which is the number of the encoded blocks included in the slice segment the end of which is indicated by the end information. For example, the image encoding method may further include: setting a default block count which is a predetermined number, as an initial value of the upper limit block count, and in updating the upper limit block count, the upper limit block count may be updated by adding the default block count to a value obtained by subtracting the slice segment block count from the upper limit block count before being updated.

Accordingly, if the slice segment block count of a slice segment the end of which is indicated by the end information is low, the upper limit block count can be increased by updating the upper limit block count. Thus, after that, a possibility of increasing the slice segment block count of a slice segment newly generated by setting end information can be increased, and the number of slice segments included in an encoded picture can be decreased. As a result, when an encoded picture is transmitted on the per slice segment basis, a time for transmitting the picture can be inhibited from increasing due to many slice segments.

The image encoding method may further include: setting an initial value of the upper limit block count, based on a default slice count which is a predetermined number of slice segments obtained from the picture, and in updating the upper limit block count, the upper limit block count may be updated by adding a minimum block count predetermined to a value obtained by subtracting the slice segment block count from the upper limit block count before being updated, and the initial value may be the number of remaining blocks included in the picture when among all the blocks included in the picture, one or more blocks of the minimum block count are assigned to each of one or more slice segments the number of which is lower by 1 than the default slice count, the one or more slice segments including the slice segment.

Accordingly, when a plurality of slice segments are sequentially generated by setting end information, based on the initial value of the upper limit block count and the updated upper limit block count, thus increasing a possibility that the earlier a slice segment is generated in the generation order, the higher the slice segment block count is.

For example, a plurality of slice segments included in a picture are sequentially generated from a slice segment located in the upper portion of a picture. In a picture of a landscape, for instance, sky is often shown in the upper region of the picture. Thus, in the region of a monotonous image such as where sky is shown, the encoding amounts of blocks are low, and thus the slice segment block count of a slice segment included in such a region and generated earlier in the generation order can be increased. Accordingly, the number of slice segments included in an encoded picture can be decreased. As a result, when the encoded picture is transmitted on the per slice segment basis, a time for transmitting the picture is inhibited from increasing due to many slice segments.

A transmission method according to an aspect of the present disclosure is a transmission method for transmitting a bitstream generated by encoding a picture, the transmission method including: sequentially encoding blocks included in the picture; deriving an encoding amount of a slice segment each time one of the blocks is encoded as a current block, the slice segment including the current block; determining whether the encoding amount derived is at least a threshold; setting end information indicating an end of the slice segment in a position in the bitstream when the encoding amount is determined to be at least the threshold, the position corresponding to the current block encoded; and storing and transmitting, in a packet, the slice segment for which the end information has been set.

Accordingly, deterioration in processing performance for encoding can be inhibited while improving transmission efficiency, similarly to the above.

Note that these general and specific aspects may be implemented using a system, a method, an integrated circuit, a computer program, a computer-readable recording medium such as a CD-ROM, or any combination of systems, methods, integrated circuits, computer programs, and recording media.

The following specifically describes embodiments, with reference to the drawings.

The embodiments described below each show a general or specific example. The numerical values, shapes, materials, elements, the arrangement and connection of the elements, steps, and the processing order of the steps, for instance, indicated in the embodiments below are mere examples, and therefore are not intended to limit the present disclosure. Thus, among the elements in the embodiments below, elements not recited in any independent claim defining the most generic concept are described as arbitrary elements.

In addition, the drawings are schematic diagrams, and do not necessarily provide strictly accurate illustrations. The same numerals are given to equivalent constituent members throughout the drawings.

Embodiment 1

Figure 5:
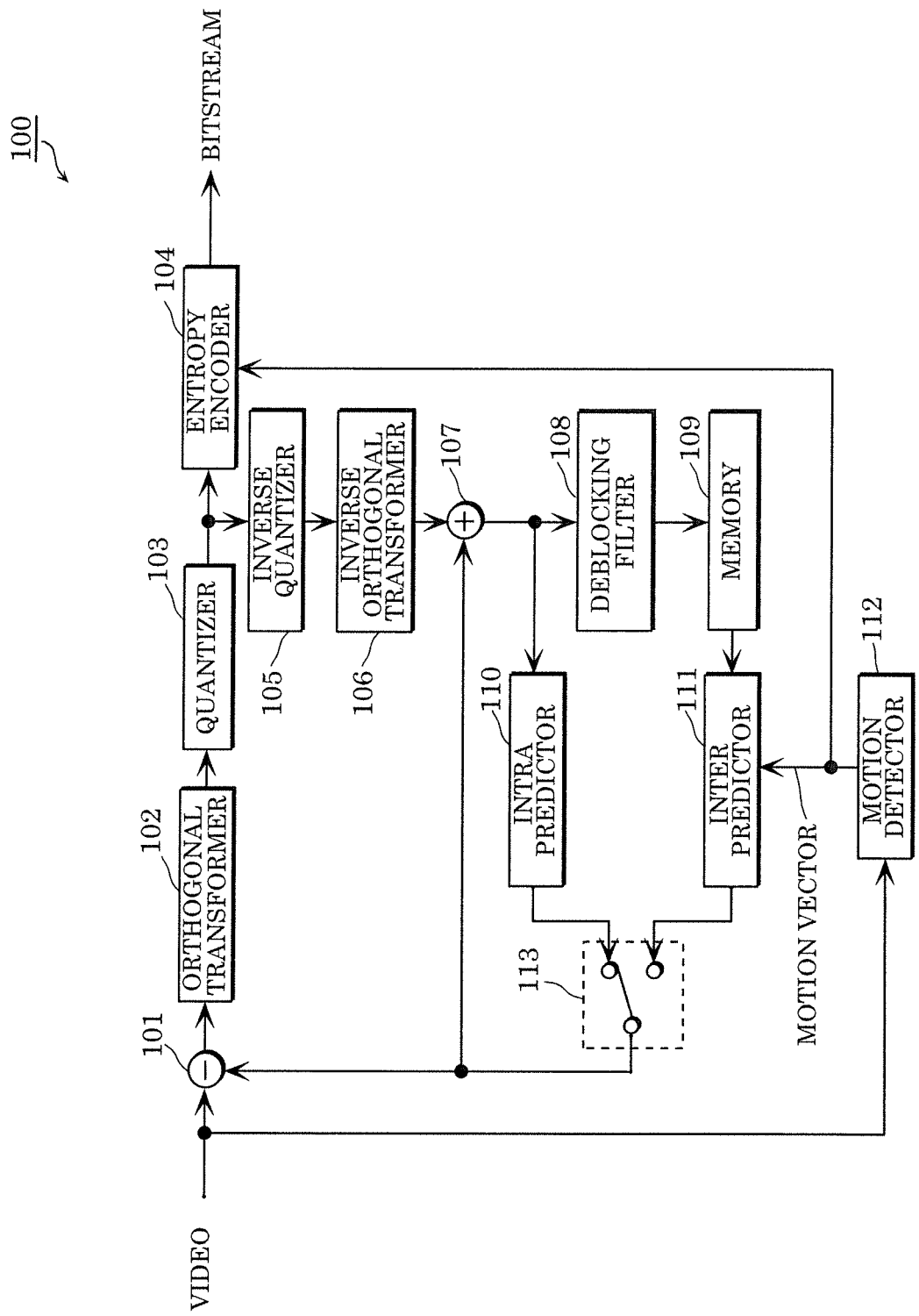
FIG. 5 is a block diagram illustrating a configuration of an image encoder according to Embodiment 1.

FIG. 5 is a block diagram illustrating a configuration of an image encoder according to the present embodiment.

Image encoder 100 according to the present embodiment can inhibit deterioration in processing performance for encoding while improving transmission efficiency. Such image encoder 100 includes subtractor 101, orthogonal transformer 102, quantizer 103, entropy encoder 104, inverse quantizer 105, inverse orthogonal transformer 106, adder 107, deblocking filter 108, memory 109, intra predictor 110, inter predictor 111, motion detector 112, and switch 113.

Subtractor 101 obtains a video signal indicating a video that includes a plurality of pictures, and also obtains a predicted image via switch 113. Subtractor 101 generates a difference image by subtracting the predicted image from a block to be encoded (hereinafter, referred to as a current block) within a picture included in the video indicated by the video signal. For example, a block corresponds to a coding tree unit (CTU), a coding unit (CU), a prediction unit (PU), or a transform unit (TU).

Orthogonal transformer 102 performs orthogonal transform (frequency transform) such as, for example, discrete cosine transform on the difference image generated by subtractor 101, to convert the difference image into a coefficient sequence constituted by a plurality of frequency coefficients. Quantizer 103 generates a quantized coefficient sequence by quantizing the frequency coefficients included in the coefficient sequence.

Inverse quantizer 105 performs inverse quantization on the coefficient sequence quantized by quantizer 103. Inverse orthogonal transformer 106 generates a decoded difference image by performing inverse orthogonal transform (inverse frequency transform) such as inverse discrete cosine transform on the frequency coefficients included in the coefficient sequence on which inverse quantization is performed.

Adder 107 obtains a predicted image via switch 113, and generates a locally decoded image (reconstructed image) by adding the predicted image and the decoded difference image generated by inverse orthogonal transformer 106.

Deblocking filter 108 removes block distortion of the locally decoded image generated by adder 107, and stores the resultant locally decoded image into memory 109. Memory 109 is for storing a locally decoded image as a reference image for inter prediction. Note that memory 109 is used as a decoded picture buffer (DPB).

Intra predictor 110 generates a predicted image (intra predicted image) by performing intra prediction on the current block, using the locally decoded image generated by adder 107.

Motion detector 112 detects a motion vector of the current block included in the video indicated by the video signal, and outputs the detected motion vector to inter predictor 111 and entropy encoder 104.

Inter predictor 111 performs motion compensation on the current block, with reference to an image stored in memory 109 as a reference image and also with use of the motion vector detected by motion detector 112. Inter predictor 111 generates a predicted image (inter predicted image) of the current block, by performing such motion compensation, that is, inter prediction on the current block.

Switch 113 outputs the predicted image (intra predicted image) generated by intra predictor 110 to subtractor 101 and adder 107 when intra prediction encoding is performed on the current block. On the other hand, switch 113 outputs the predicted image (inter predicted image) generated by inter predictor 111 to subtractor 101 and adder 107 when inter prediction encoding is to be performed on the current block.

Entropy encoder 104 generates a bitstream by performing entropy encoding (variable length encoding) on the coefficient sequence quantized by quantizer 103 and the motion vector detected by motion detector 112. In the present embodiment, entropy encoder 104 splits a picture into a plurality of slice segments.

Figure 6:
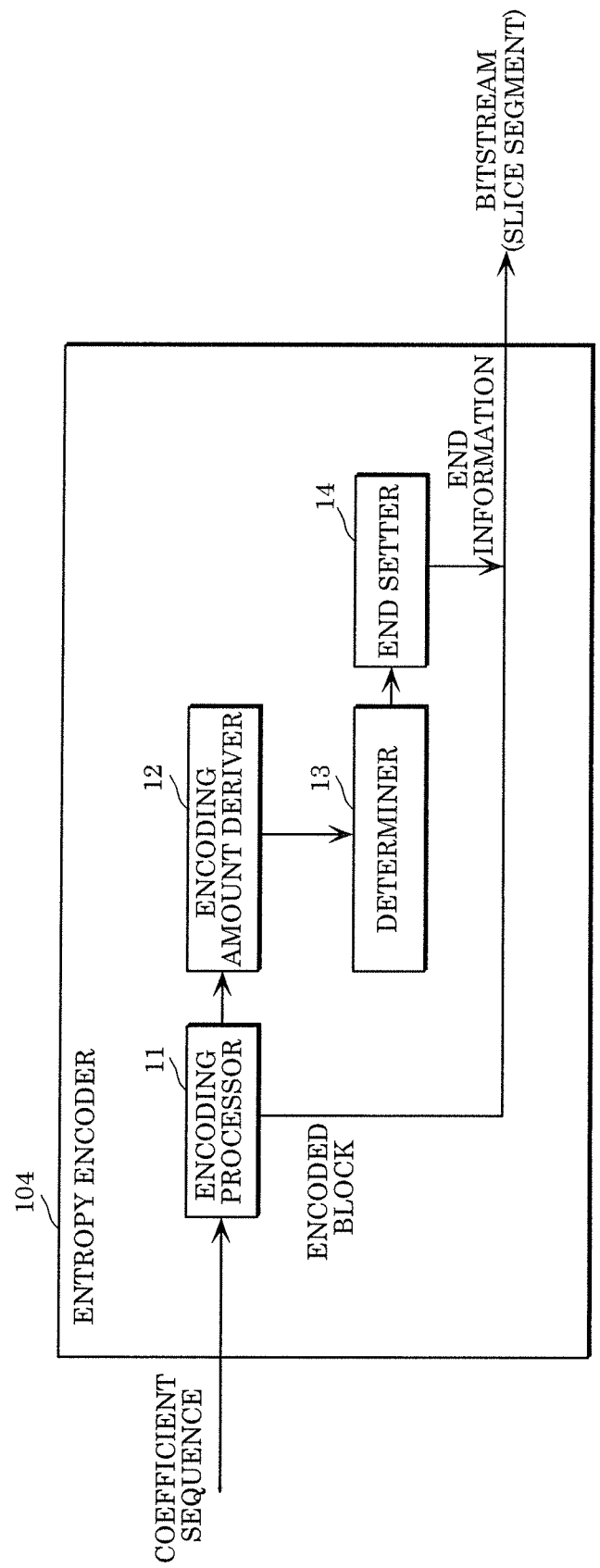
FIG. 6 is a block diagram illustrating an example of a configuration of an entropy encoder according to Embodiment 1.

FIG. 6 is a block diagram illustrating an example of a configuration of entropy encoder 104 according to the present embodiment.

Entropy encoder 104 includes encoding processor 11, encoding amount deriver 12, determiner 13, and end setter 14.

Encoding processor 11 sequentially performs entropy encoding on a plurality of blocks included in a picture. Note that the blocks on which entropy encoding is performed are subjected to orthogonal transform and quantization, and each constituted as a coefficient sequence as described above. Note that the following are descriptions, assuming that blocks are CTUs.

Each time entropy encoding is performed on a current CTU which is one of the CTUs, encoding amount deriver 12 derives the encoding amount of a slice segment which includes the current CTU.

Determiner 13 determines whether the derived encoding amount is at least a threshold. The threshold is a numerical value of at most the size of a packet (specifically, an MTU value) used for network transmission of a bitstream.

When the encoding amount is determined to be at least the threshold, end setter 14 sets end information (for example, end_of_slice_segment_flag=1) which indicates the end of the slice segment in a position corresponding to the current CTU on which entropy encoding is performed in a bitstream. Note that a position corresponding to the current CTU on which entropy encoding is performed in a bitstream may be located immediately after the current CTU, immediately before the current CTU, or immediately after a CTU subsequent to the current CTU.

Accordingly, this sets the end (namely, the boundary) of a slice segment. Specifically, an encoded picture included in a bitstream can be split into a plurality of slice segments each having an encoding amount that is at most an MTU value and close to the MTU value. Specifically, one slice segment can be stored in a single packet while reducing unused space in the packet. As a result, wasteful unused space in the packet can be reduced, and the efficiency of network transmission can be improved.

Figure 7:
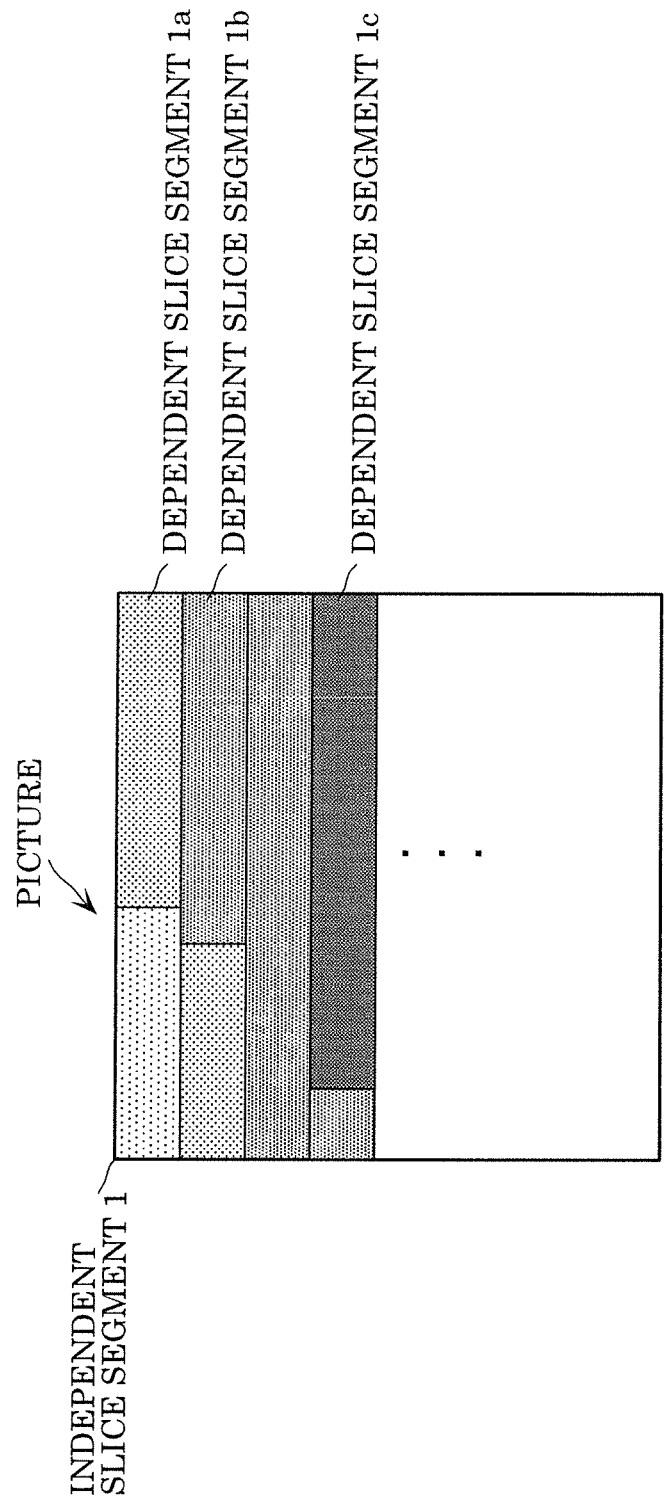
FIG. 7 illustrates examples of slice segments included in a picture encoded by the image encoder according to Embodiment 1.

FIG. 7 illustrates examples of slice segments included in a picture encoded by image encoder 100 according to the present embodiment.

The encoded picture is split into a plurality of slice segments as illustrated in FIG. 7. A set that includes a plurality of slice segments corresponds to a slice. In other words, a slice is split into a plurality of slice segments. Such a split is also referred to as a dependent slice split. Each of the slice segments is one of an independent slice segment and at least one dependent slice segment which depends on the independent slice segment, the independent slice segment and the at least one dependent slice segment being included in a slice included in a picture. For example, as illustrated in FIG. 7, a picture includes independent slice segment 1 disposed at the leading end of a picture (upper left end), and dependent slice segments 1a, 1b, 1c, and so on which depend on independent slice segment 1.

An independent slice segment and a dependent slice segment correspond to independent slice data and dependent slice data of NPL 1 stated above. Specifically, an independent slice segment and a dependent slice segment have the following features.

An independent slice segment and a dependent slice segment each have a slice header. Accordingly, the slice segments constitute a network abstraction layer (NAL) unit. However, syntax information included in the slice header of a dependent slice segment is less than syntax information included in the slice header of an independent slice segment. Thus, a large amount of the syntax information included in the slice header of the independent slice segment is copied and used to decode the dependent slice segment. Hence, the image decoding device cannot decode a dependent slice segment only using the slice header of the dependent slice segment, and needs the slice header of the independent slice segment as described above.

For intra prediction of a CTU and calculation of a motion vector predictor thereof, information of another CTU can be referred to in a picture which includes an independent slice segment and at least one dependent slice segment that depends thereon. Specifically, in such a picture, the processes such as motion estimation and prediction are the same for a plurality of slice segments different from each other. In other words, unlike the boundary of a slice, image encoder 100 can make reference over the boundary of a dependent slice segment in intra prediction and calculation of a motion vector predictor for a dependent slice segment. Accordingly, a decrease in encoding efficiency can be prevented in such a picture since a reference relation is not interrupted.

Specifically, as illustrated in FIG. 3B, irrespective of whether the end of a slice segment that includes block Bk1 is set, entropy encoding on block Bk1 allows encoding subsequent block Bk2 to start with reference to another slice segment. Thus, in a series of pipeline processing for encoding in which motion estimation, prediction, orthogonal transform and quantization, and entropy encoding are performed in this order, after last block Bk1 included in a slice segment is encoded, processing such as motion estimation already performed on subsequent block Bk2 by referring to another slice segment can be prevented from being performed again. Accordingly, the occurrence of pipeline bubbles illustrated in FIG. 4 can be inhibited. As a result, deterioration in processing performance for encoding can be inhibited.

Figure 8:
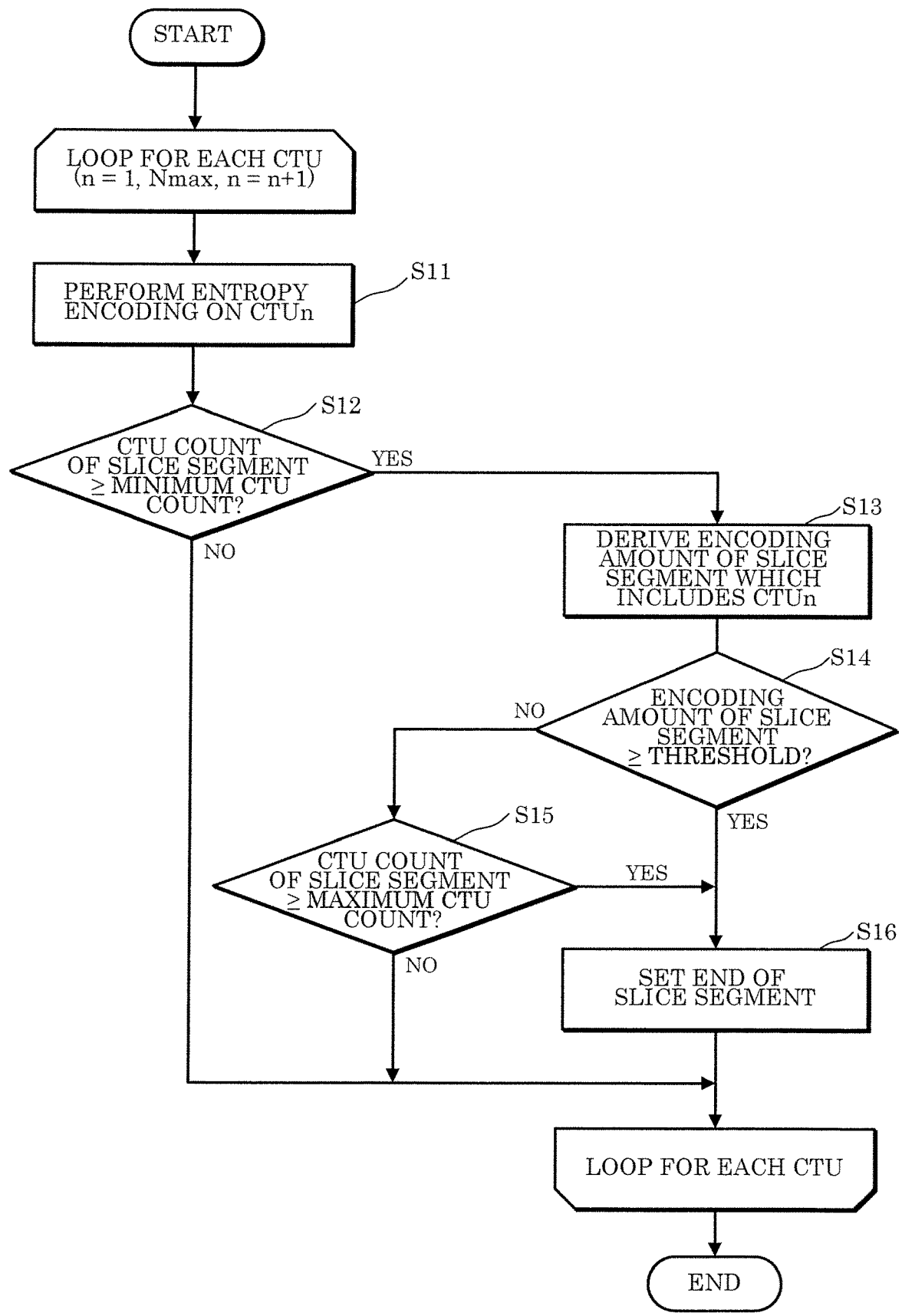
FIG. 8 is a flowchart illustrating an example of processing operation performed by the entropy encoder according to Embodiment 1.

FIG. 8 is a flowchart illustrating an example of processing operation performed by entropy encoder 104 according to the present embodiment.

Entropy encoder 104 sequentially performs, for each of CTUs included in a picture, processes in steps S11 to S16 illustrated in FIG. 8. The CTUs are all CTUs from the first to Nmax-th CTUs included in a picture, for example, and are sequentially processed each as a current CTU. Note that in the following, the n-th current CTU is indicated as a CTUn.

First, encoding processor 11 performs entropy encoding on a current CTUn constituted by a coefficient sequence (step S11). Next, determiner 13 determines whether a CTU count which is the number of CTUs which are included in a current slice segment and on which entropy encoding has been already performed is at least the minimum CTU count (step S12). Note that a current slice segment is a slice segment which includes a current CTUn on which entropy encoding is performed in step S11. Specifically, the CTU count determined through the process in step S12 includes the number of current CTUns on which entropy encoding is performed in previous step S11 (namely, 1).

Here, if determiner 13 determines that the CTU count is not at least the minimum CTU count (No in step S12), entropy encoder 104 repeats the processing from step S11. When this processing is repeated, the (n+1)-th CTU subsequent to the n-th CTU is processed as a current CTU. Note that when the n-th CU is the Nmax-th CU, entropy encoder 104 ends the entropy encoding on the picture without repeating the processing from step S11.

On the other hand, when determiner 13 determines that the CTU count is at least the minimum CTU count (Yes in step S12), encoding amount deriver 12 derives the encoding amount of the current slice segment (step S13). For example, if the current slice segment includes a portion on which entropy encoding has already been performed before most recent step S11, encoding amount deriver 12 adds the encoding amount of the current CTUn on which entropy encoding is performed in most recent step S11 to the encoding amount of the portion. Accordingly, the encoding amount of the current slice segment is derived.

Then, determiner 13 determines whether the encoding amount of the current slice segment derived in step S13 is at least a threshold (step S14). Here, if determiner 13 determines that the encoding amount of the current slice segment is not at least the threshold (No in step S14), determiner 13 further determines whether the CTU count of the current slice segment is at least the maximum CTU count (step S15).

Here, if determiner 13 determines that the CTU count is not at least the maximum CTU count (No in step S15), entropy encoder 104 repeats the processing from step S11.

In step S14, if determiner 13 determines that the encoding amount of the current slice segment is at least the threshold (Yes in step S14), end setter 14 sets end information which indicates the end of the current slice segment (step S16). Also if determiner 13 determines in step S15 that the CTU count is at least the maximum CTU count (Yes in step S15), end setter 14 sets the end information which indicates the end of the current slice segment (step S16).

The end of the current slice segment is determined by setting such end information.

Here, the minimum CTU count as mentioned above is 44, for example. Specifically, when the number of pixels per picture is 4096×2160, 32×32-pixel CTUs included in a single picture are 8640 CTUs. Nevertheless, the HEVC standard limits the maximum number of slice segments per picture to 200 or less. Accordingly, if the number of CTUs included in each of the slice segments is set to at least 44 (8640/200=43.2) which is the minimum CTU count by performing step S12 illustrated in FIG. 8, the number of slice segments per picture can be limited to at most 200 in conformity with the HEVC standard.

The maximum CTU count described above is 2160, for example. Specifically, when the number of pixels per picture is 4096×2160, it is desirable to split one picture into four or more slice segments in order to carry out parallel processing on slice segments in the image decoding device. Accordingly, the number of CTUs included in each of the slice segments is set to at most 2160 (8640/4) which is the maximum CTU count by performing step S15 illustrated in FIG. 8, the number of slice segments per picture can be set to four or more.

Desirably, the threshold mentioned above is set such that one slice segment is stored in a single packet while reducing the unused space in the single packet. Accordingly, transmission efficiency can be improved. For example, as described above, the MTU value is 1500 bytes in the case of Ethernet (registered trademark). Thus, the threshold is 1500 bytes, for example.

[Conclusion]

As described above, an image encoding method according to the present embodiment is an image encoding method for generating a bitstream by encoding a picture, and in the image encoding method, a plurality of CTUs included in the picture are first encoded sequentially. Next, each time a current CTU which is one of the CTUs is encoded, the encoding amount of a slice segment which includes the current CTU is derived, and whether the derived encoding amount is at least a threshold is determined. Then, when the derived encoding amount is determined to be at least the threshold, end information indicating an end of the slice segment is set in a position corresponding to the encoded current CTU in the bitstream. This slice segment is one of an independent slice segment and at least one dependent slice segment which depends on the independent slice segment, the independent slice segment and the at least one dependent slice segment being included in a slice included in the picture. A threshold is a numerical value of at most a size of a packet used for network transmission of the bitstream.

Accordingly, each time a CTU is encoded, the encoding amount of a slice segment is derived, and when the encoding amount is at least the threshold, the end of the slice segment is set, and thus a picture can be split into a plurality of slice segments each having an intended encoding amount. Specifically, the unused space in a packet is reduced, and the slice segment can be stored in the packet. As a result, wasteful unused space in a packet can be reduced, and efficiency of network transmission can be improved.

Further, each of the slice segments is one of an independent slice segment and a dependent slice segment, and one slice segment can be referred to encode another slice segment. Accordingly, according to the encoding amount of a slice segment derived by encoding a CTU and irrespective of whether the CTU is the last CTU of the slice segment, encoding a subsequent CTU can be started with reference to another slice segment. Accordingly, in a series of pipeline processing for encoding performed in the order of motion estimation, prediction, orthogonal transformation and quantization, and entropy encoding, after the last CTU included in a slice segment is encoded, processes such as motion estimation already performed on a subsequent CTU with reference to another slice segment can be prevented from being performed again on the subsequent CTU. As a result, deterioration in processing performance for encoding can be inhibited.

In the image encoding method, whether the number of encoded CTUs included in a slice segment the encoding amount of which has been derived is at least the predetermined minimum CTU count is determined. Then, in determining whether the derived encoding amount is at least the threshold, when the number of encoded CTUs is determined to be at least the minimum CTU count, whether the derived encoding amount is at least the threshold is determined.

Accordingly, when the number of encoded CTUs which are included in a slice segment is lower than the minimum CTU count, the end of the slice segment is not set, and thus the number of CTUs included in the slice segment can be set to at least the minimum CTU count. Accordingly, slice segments of at most the number (for example, 200) in accordance with the HEVC standard, for example, can be generated.

In the image encoding method, when the derived encoding amount is determined to be lower than the threshold, whether the number of encoded CTUs included in the slice segment the encoding amount of which has been derived is at least the predetermined maximum CTU count is determined. Then, when the number of encoded CTUs is determined to be at least the maximum CTU count, end information indicating the end of the slice segment is set in a position corresponding to an encoded current CTU in the bitstream.

Accordingly, even if the encoding amount of the slice segment is less than the threshold, if the number of encoded CTUs included in the slice segment is at least the maximum CTU count, the end of the slice segment is set. Accordingly, the number of CTUs included in the slice segment is limited to at most the maximum CTU count, and thus a picture can be split into slice segments the number of which is at least an optimal number. The optimal number is 4. Accordingly, the image decoder can decode the four slice segments in parallel.

Encoding a plurality of CTUs includes binarization and arithmetic encoding, and in deriving the encoding amount of the slice segment, the encoding amount of the slice segment is derived using the amount of binarized data of the current CTU on which the binarization has been performed and the arithmetic encoding has not been performed yet. For example, in deriving the encoding amount of the slice segment, the encoding amount of the current CTU on which the arithmetic encoding has been performed is estimated from the amount of binarized data, and the encoding amount of the slice segment is derived using the estimated encoding amount of the current CTU.

Accordingly, before arithmetic encoding on the current CTU is completed, the encoding amount of the slice segment can be derived using the amount of data of the current CTU. Accordingly, encoding processing can be accelerated. In addition, arithmetic encoding which takes a comparatively long process time can be excluded from the pipeline processing.

The transmission method according to the present embodiment is a transmission method for transmitting a bitstream generated by encoding a picture, and in the transmission method, a plurality of CTUs included in a picture are first encoded sequentially. Next, each time a current CTU which is one of the CTUs is encoded, the encoding amount of a slice segment which includes the current CTU is derived, and whether the derived encoding amount is at least a threshold is determined. Then, when the derived encoding amount is determined to be at least the threshold, end information indicating the end of the slice segment is set in a position corresponding to an encoded current CTU in a bitstream, and a slice segment which includes the end information is stored and transmitted in a packet.

Accordingly, similarly to the above, deterioration in the processing performance for encoding can be inhibited while improving transmission efficiency.

Variation

In the above embodiment, after performing entropy encoding on a current CTU, the encoding amount of a current slice segment is derived using the actual encoding amount of the current CTU on which entropy encoding has been performed, yet the encoding amount of the current CTU may be estimated. In this variation, encoding amount deriver 12 estimates the encoding amount of a current CTU before encoding processor 11 completes entropy encoding on the current CTU.

Figure 9:
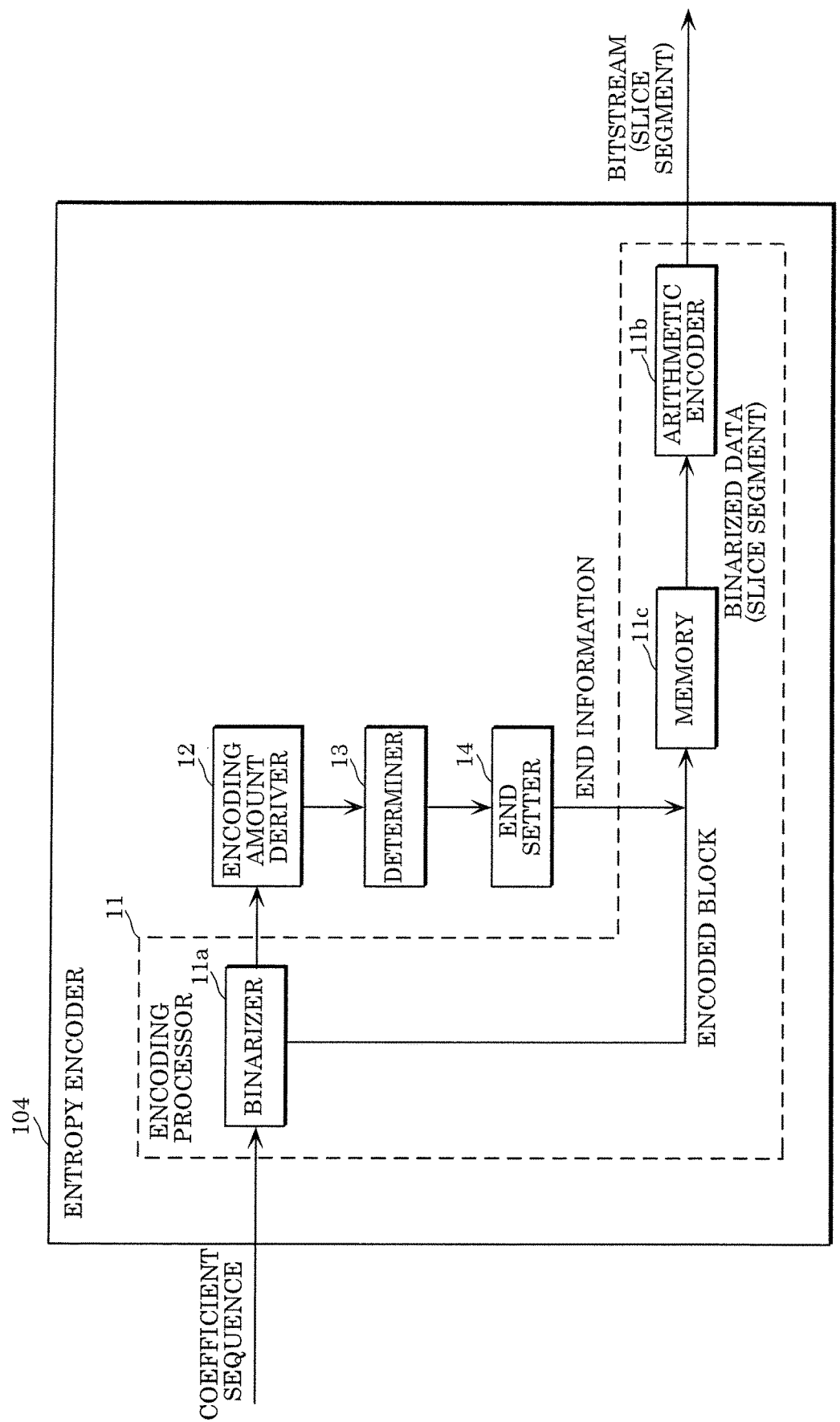
FIG. 9 is a block diagram illustrating an example of a configuration of an entropy encoder according to a variation of Embodiment 1.

FIG. 9 is a block diagram illustrating an example of a configuration of entropy encoder 104 according to a variation of the above embodiment.

Encoding processor 11 of entropy encoder 104 according to this variation performs entropy encoding on a current CTU by context-adaptive binary arithmetic coding (CA-BAC). Specifically, as illustrated in FIG. 9, encoding processor 11 includes binarizer 11a, arithmetic encoder 11b, and memory 11c.

According to a predetermined transform method, binarizer 11a transforms a coefficient sequence of a current CTU into binarized data, and stores the binarized data into memory 11c.

Memory 11c stores end information output from end setter 14 as well as binarized data of CTUs. Note that in this variation, when the encoding amount of a slice segment that includes a current CTU is determined to be at least a threshold, end setter 14 outputs end information into a position corresponding to the binarized data of the current CTU.

Arithmetic encoder 11b reads binarized data from memory 11c, and performs arithmetic encoding. Specifically, arithmetic encoder 11b stores inside a table indicating 0/1 occurrence probabilities, and obtains a probability of the occurrence of 0 or 1 for the subsequent bit, with reference to the table. Then, arithmetic encoder 11b performs arithmetic encoding on the binarized data using an occurrence probability. Note that arithmetic encoder 11b updates a probability of the occurrence of 0 or 1 indicated by the table inside when the value of a bit is not as predicted. Arithmetic encoder 11b outputs a current CTU on which arithmetic encoding has been performed. When arithmetic encoder 11b reads end information from memory 11c, arithmetic encoder 11b performs arithmetic encoding on the end information.

Encoding amount deriver 12 obtains binarized data as mentioned above from binarizer 11a, and estimates the encoding amount of the current CTU from the binarized data. For example, encoding amount deriver 12 holds a conversion table which indicates, for each binarized data, the binarized data and the encoding amount for the binarized data, and estimates the encoding amount of the current CTU by referring to the conversion table. Such a method of specifically estimating an encoding amount is disclosed by Japanese Unexamined Patent Application Publication No. 2009-38746 which is a patent literature.

Accordingly, in this variation, encoding a plurality of CTUs includes binarization and arithmetic encoding. In deriving the encoding amount of a slice segment, the encoding amount of a slice segment is derived using the amount of binarized data of a current CTU on which the binarization has been performed and the arithmetic encoding has not been performed yet. Thus, in deriving the encoding amount of the slice segment, the encoding amount of the current CTU on which arithmetic encoding has been performed is estimated from the amount of binarized data, and the encoding amount of a slice segment is derived using the estimated encoding amount of the current CTU. Alternatively, taking into consideration the error difference between the encoding amount of the current CTU and the estimated encoding amount of the current CTU, an approximately 95% data amount of the estimated encoding amount of the current CTU may be derived as the encoding amount of the current CTU.

Accordingly, before arithmetic encoding on the current CTU is completed, the encoding amount of the slice segment can be derived using the amount of data of the current CTU. Accordingly, encoding processing can be accelerated. In addition, the arithmetic encoding which takes a comparatively long process time can be excluded from the pipeline processing.

In the above variation, the encoding amount of the current CTU on which arithmetic encoding has been performed is estimated from the amount of binarized data, yet the amount of binarized data may be derived as the encoding amount of the current CTU. Alternatively, the relation between the amount of binarized data and the encoding amount of the binarized data changes according to a bit rate, and thus when the bit rate is low, approximately 70% of the amount of binarized data may be derived as the encoding amount of the current CTU. In addition, when the bit rate is high, approximately 80% of the amount of binarized data may be derived as the encoding amount of the current CTU.

Embodiment 2

In Embodiment 1, the maximum block count, that is, the maximum CTU count is fixed, whereas in the present embodiment, the maximum CTU count is updated as an upper limit CTU count. Note that an image encoder according to the present embodiment has the same configuration as that of image encoder 100 according to Embodiment 1, and the present embodiment differs from Embodiment 1 in that determiner 13 updates the upper limit CTU count.

Figure 10:
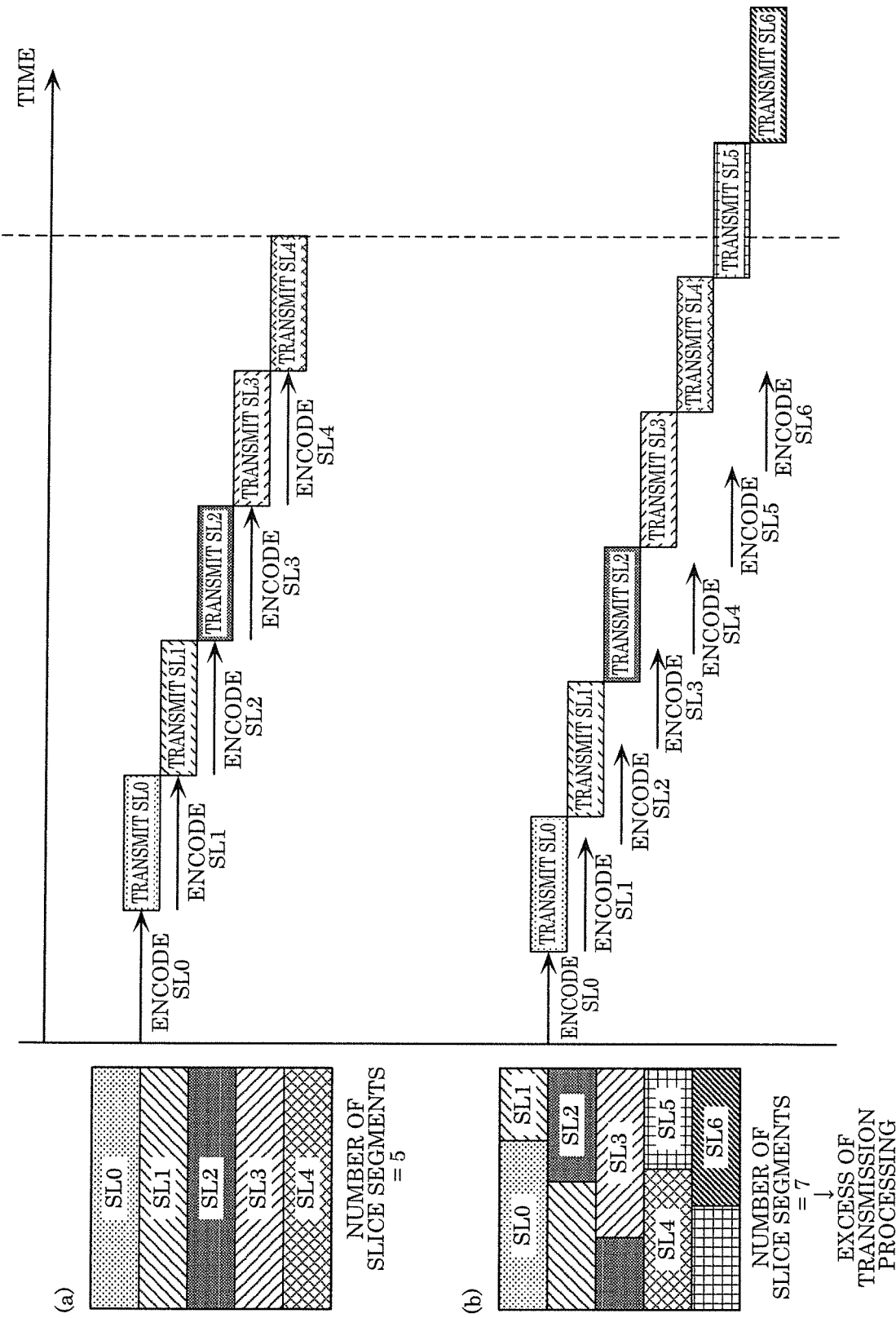
FIG. 10 illustrates examples of transmission times for pictures encoded and transmitted by the image encoder according to Embodiment 1.

FIG. 10 illustrates examples of transmission times for pictures encoded and transmitted by image encoder 100 according to Embodiment 1.

For example, image encoder 100 according to Embodiment 1 splits a picture into five slice segments SL0 to SL4, based on, for instance, the encoding amounts of slice segments as illustrated in (a) of FIG. 10. Then, image encoder 100 sequentially transmits five slice segments SL0 to SL4.

However, when encoding a different picture, image encoder 100 according to Embodiment 1 may split the picture into six or more slice segments according to image data of the picture, as illustrated in (b) of FIG. 10. Specifically, image encoder 100 may split a picture into seven slice segments SL0 to SL6 as illustrated in (b) of FIG. 10. In this case, image encoder 100 sequentially transmits seven slice segments SL0 to LS6. For example, the slice segments are each stored in one packet and transmitted. The data string of this packet has a fixed length, and has a predetermined number of bits irrespective of the encoding amount of the slice segment. Accordingly, the more slice segments are included in an encoded picture, the longer time it takes to transmit the encoded picture. Specifically, in the example illustrated in (b) of FIG. 10, a time to transmit the encoded picture is longer than the time in the example illustrated in (a) of FIG. 10.

In Embodiment 1, one cause of image encoder 100 splitting a picture into many slice segments is that the maximum CTU count is fixed. Specifically, as illustrated in FIG. 8, even if the encoding amount of the current slice segment is lower than the threshold, an end of the current slice segment is set if the number of CTUs included in the current slice segment is the maximum CTU count. Accordingly, the remaining CTUs not included in the current slice segment are included in the subsequent slice segment. As a result, the picture is split into many slice segments. Here, if the maximum CTU count is increased, the remaining CTUs can be included in the current slice segment, and the number of slice segments can be decreased.

In view of this, image encoder 100 according to the present embodiment updates the maximum CTU count as an upper limit CTU count.

Figure 11:
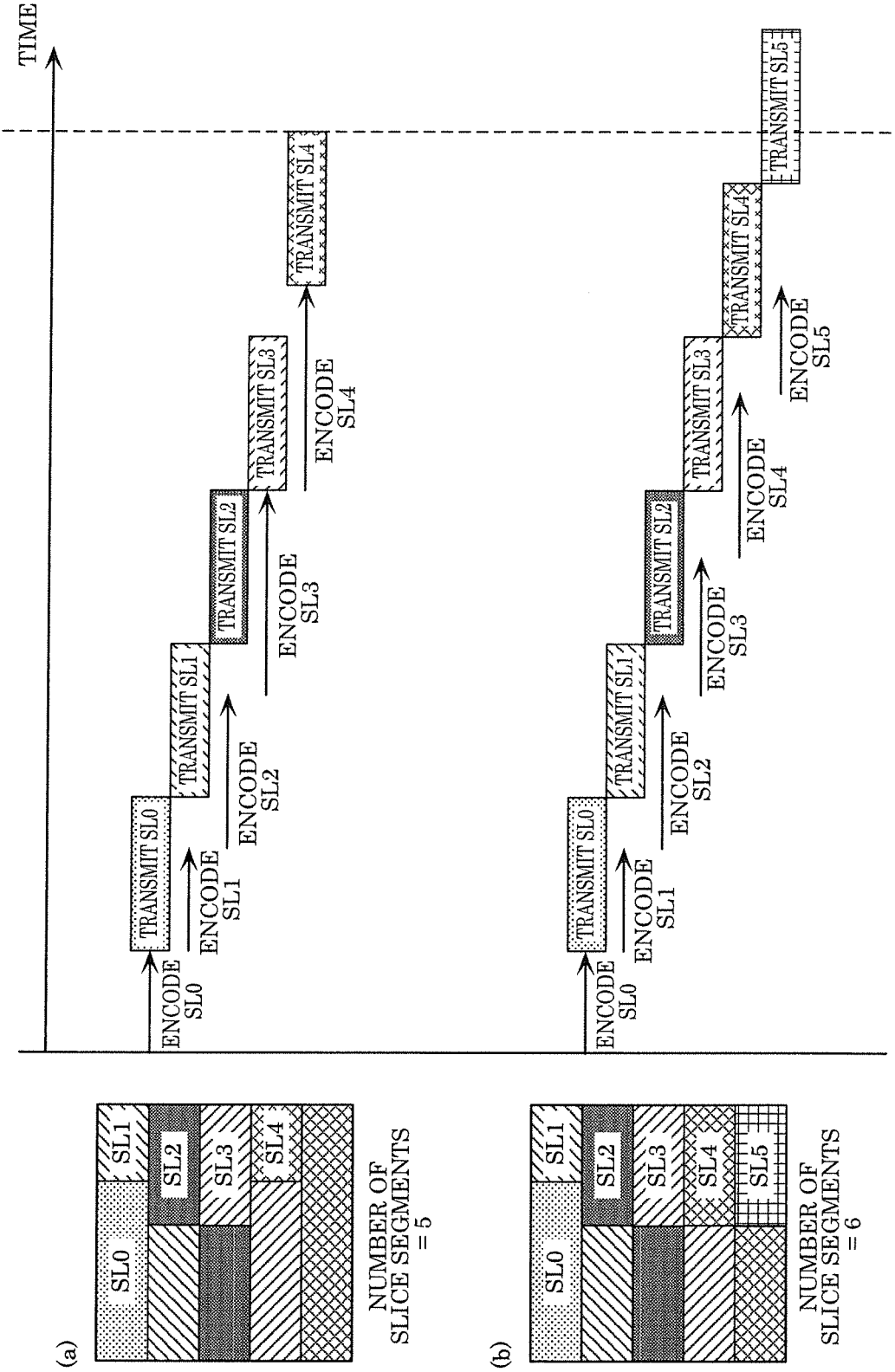
FIG. 11 illustrates examples of pictures split by an image encoder according to Embodiment 2, in comparison with Embodiment 1.

FIG. 11 illustrates examples of pictures split by image encoder 100 according to the present embodiment, in comparison with Embodiment 1. Specifically, (a) of FIG. 11 illustrates an example of a picture split according to the present embodiment, whereas (b) of FIG. 11 illustrates an example of a picture split according to Embodiment 1.

In Embodiment 1, image encoder 100 sequentially generates a plurality of slice segments from a picture by setting end information described above, as illustrated in (b) of FIG. 11. In other words, image encoder 100 sequentially encodes the plurality of slice segments.

In such a case, in Embodiment 1, even if the number of CTUs included in each of encoded slice segments SL0 and SL1 is lower than the maximum CTU count, image encoder 100 maintains the maximum CTU count without updating the count. Accordingly, even if the encoding amounts of slice segments SL2, SL3, and SL4 are lower than the threshold, image encoder 100 sequentially encodes slice segments SL2, SL3, and SL4 each including only the maximum CTU count of CTUs. Further, image encoder 100 encodes slice segment SL5 which includes a small number of remaining CTUs.

As a result, in Embodiment 1, image encoder 100 splits a picture into six slice segments SL0 to SL5, as illustrated in (b) of FIG. 11. Specifically, image encoder 100 encodes six slice segments SL0 to SL5 in the order of slice segments SL0, SL1, SL2, SL3, SL4, and SL5. Then, each time one of six slice segments SL0 to SL5 is encoded, image encoder 100 transmits the slice segment.

On the other hand, also in the present embodiment, image encoder 100 sequentially generates a plurality of slice segments from a picture by setting end information as described above, as illustrated in (a) of FIG. 11. In other words, image encoder 100 sequentially encodes the plurality of slice segments.

However, in the present embodiment, when the number of CTUs included in each of encoded slice segments SL0 and SL1 is lower than the upper limit CTU count as in the above case, image encoder 100 updates the upper limit CTU count. Specifically, image encoder 100 increases the upper limit CTU count. More specifically, each time image encoder 100 encodes a slice segment, image encoder 100 adds a difference between the number of CTUs included in the encoded slice segment and the upper limit CTU count before being updated to the initial value of the upper limit CTU count. Accordingly, if the number of CTUs included in an encoded slice segment is low, the upper limit CTU count can be increased. As a result, image encoder 100 according to the present embodiment can encode slice segments SL3 and SL4 each including many CTUs, using the increased upper limit CTU count. Accordingly, the number of slice segments generated from one picture can be reduced in the present embodiment without encoding slice segment SL5 which is encoded in Embodiment 1.

Stated differently, as illustrated in (a) of FIG. 11, image encoder 100 according to the present embodiment splits a picture into five slice segments SL0 to SL4 which are less by 1 than the example in (b) of FIG. 11. Specifically, image encoder 100 can sequentially encode and transmit only five slice segments SL0 to SL4. Accordingly, image encoder 100 according to the present embodiment can decrease the time for transmitting an encoded picture as compared with the example illustrated in (b) of FIG. 11.

Figure 12:
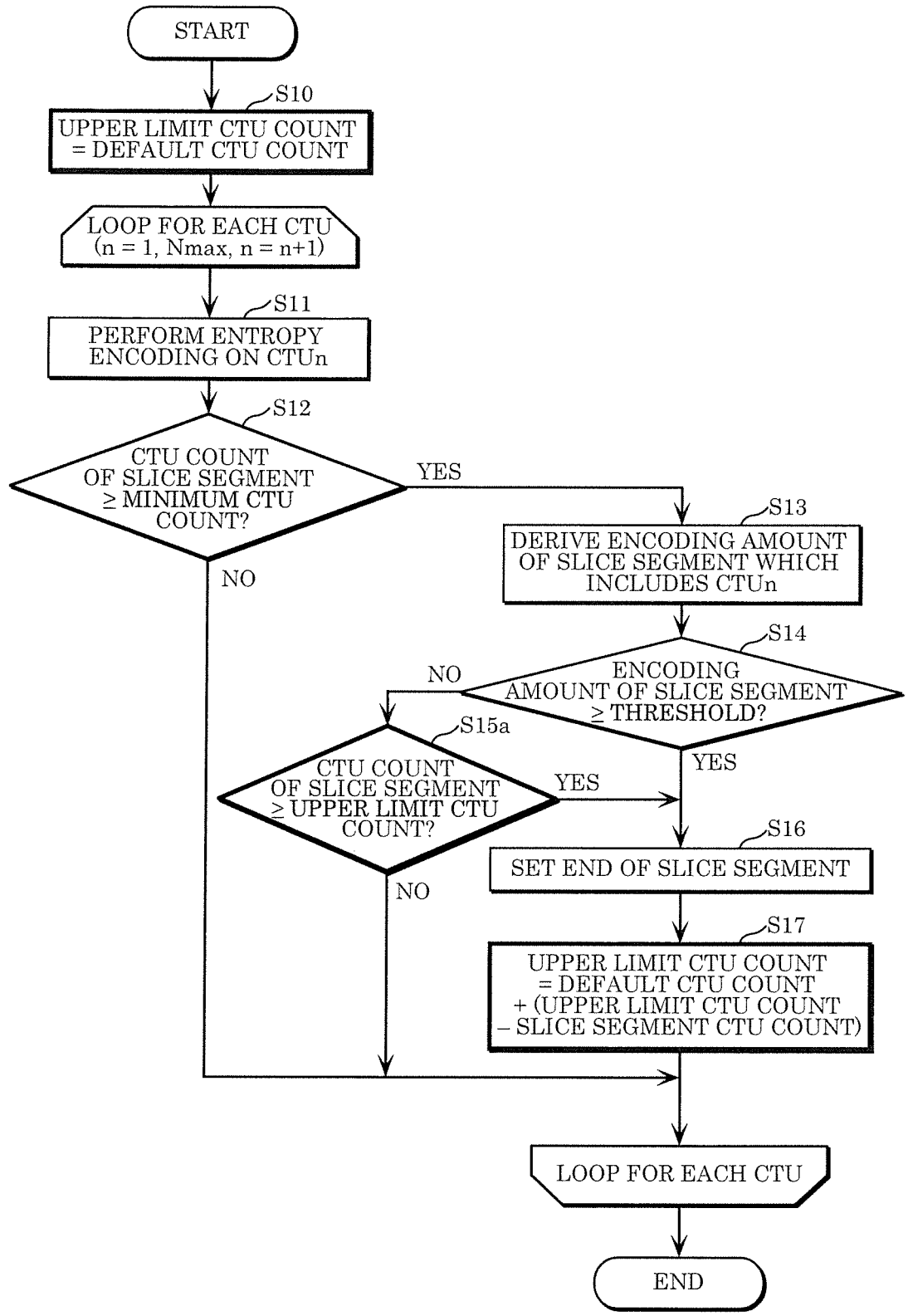
FIG. 12 is a flowchart illustrating an example of processing operation by an entropy encoder included in an image encoder according to Embodiment 2.

FIG. 12 is a flowchart illustrating an example of processing operation performed by entropy encoder 104 of image encoder 100 according to the present embodiment.

Entropy encoder 104 performs a process in step S10 illustrated in FIG. 12 on a picture, and next, sequentially performs processes in steps S11 to S17 on each of a plurality of CTUs included in the picture. Note that among the processes in steps S10 to S17 illustrated in FIG. 12, the same processes as those in the steps illustrated in FIG. 8 in Embodiment 1 are illustrated using the same signs as those in FIG. 8, and a detailed description thereof is omitted.

First, determiner 13 sets a predetermined default CTU count as the initial value of the upper limit CTU count (step S10).

Then, encoding processor 11 performs entropy encoding on a current CTUn constituted by a coefficient sequence (step S11). Next, determiner 13 determines whether the CTU count which is the number of CTUs which are included in a current slice segment and on which entropy encoding has already been performed is at least the minimum CTU count (step S12).

Here, if determiner 13 determines that the CTU count is not at least the minimum CTU count (No in step S12), entropy encoder 104 repeats the processing from step S11.

On the other hand, if determiner 13 determines that the CTU count is at least the minimum CTU count (Yes in step S12), encoding amount deriver 12 derives the encoding amount of the current slice segment (step S13).

Then, determiner 13 determines whether the encoding amount of the current slice segment derived in step S13 is at least the threshold (step S14). Here, if determiner 13 determines that the encoding amount of the current slice segment is not at least the threshold (No in step S14), determiner 13 further determines whether the CTU count of the current slice segment is at least the upper limit CTU count (step S15a).

Here, if determiner 13 determines that the CTU count is not at least the upper limit CTU count (No in step S15a), entropy encoder 104 repeats the processing from step S11.

In step S14, if determiner 13 determines that the encoding amount of the current slice segment is at least the threshold (Yes in step S14), end setter 14 sets end information indicating the end of the current slice segment (step S16). In step S15a, also when determiner 13 determines that the CTU count is at least the upper limit CTU count (Yes in step S15a), end setter 14 sets end information indicating the end of the current slice segment (step S16).

The end of the current slice segment is defined by setting such end information. In this manner, a slice segment is generated, or in other words, encoded.

Then, after the process in step S16 is performed, determiner 13 updates the upper limit CTU count (step S17). Specifically, determiner 13 updates the upper limit CTU count by adding the difference mentioned above to the default CTU count. The difference is a number obtained by subtracting, from the upper limit CTU count before being updated, the slice segment CTU count which is the number of CTUs included in the slice segment the end of which is set in step S16.

As described above, when the derived encoding amount is determined to be lower than the threshold, image encoder 100 according to the present embodiment determines whether the number of encoded blocks included in the slice segment the encoding amount of which has been derived is at least the upper limit block count. When the number of encoded blocks is determined to be at least the upper limit block count, image encoder 100 sets end information indicating the end of a slice segment in a position corresponding to the encoded current block in a bitstream. Image encoder 100 updates the upper limit block count, according to the slice segment block count which is the number of encoded blocks included in a slice segment the end of which is indicated by end information. Note that the above block is, for example, a CTU, the upper limit block count is, for example, the upper limit CTU count, and the slice segment block count is, for example, a slice segment CTU count.

For example, image encoder 100 sets the default block count which is a predetermined number, as an initial value of the upper limit block count. Then, in updating the upper limit block count, image encoder 100 updates the upper limit block count by adding the default block count to the value obtained by subtracting the slice segment block count from the upper limit block count before being updated.

Thus, if the slice segment block count of a slice segment the end of which is indicated by end information is low, the upper limit block count can be increased by updating the upper limit block count. Accordingly, after that, a possibility of increasing the slice segment block count of a slice segment newly generated by setting end information can be increased, and the number of slice segments included in an encoded picture can be decreased. As a result, when the encoded picture is transmitted on the per slice segment basis, a time for transmitting the picture is inhibited from being increased due to many slice segments.

Embodiment 3

In Embodiment 1, the maximum block count, that is, the maximum CTU count is fixed, whereas in the present embodiment, the maximum CTU count is updated as an upper limit CTU count, similarly to Embodiment 2. In Embodiment 2, an upper limit CTU count is first set to a comparatively small number as an initial value, and each time a slice segment is encoded, the upper limit CTU count is updated according to the number of CTUs included in the slice segment. However, in the present embodiment, the upper limit CTU count is first set to a value as high as possible as an initial value, and each time a slice segment is encoded, the upper limit CTU count is updated according to the number of CTUs included in the slice segment. Note that the image encoder according to the present embodiment has the same configuration as those of image encoder 100 according to Embodiments 1 and 2. The methods for determiner 13 to set and update the upper limit CTU count are different between the present embodiment and Embodiment 2.

Figure 13:
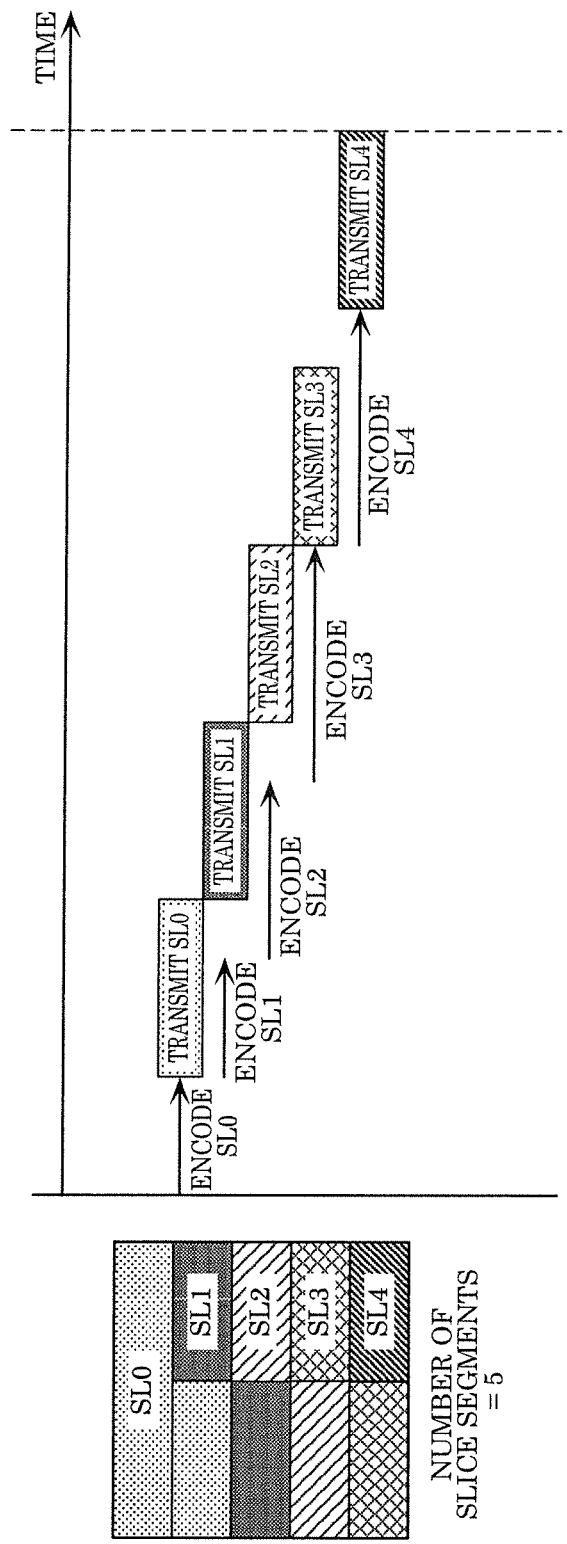
FIG. 13 illustrates an example of a transmission time for a picture encoded and transmitted by an image encoder according to Embodiment 3.

FIG. 13 illustrates an example of a transmission time for a picture encoded and transmitted by image encoder 100 according to the present embodiment.

Also in the present embodiment, image encoder 100 sequentially generates a plurality of slice segments from a picture by setting end information as described above, as illustrated in FIG. 13. In other words, image encoder 100 sequentially encodes a plurality of slice segments.

However, in the present embodiment, image encoder 100 splits a picture into slice segments of a default slice count (5 in the example in FIG. 13) which is a predetermined number, which differs from the above embodiments. Specifically, in the present embodiment, image encoder 100 splits a picture into predetermined five slice segments SL0 to SL4 as illustrated in FIG. 13. In other words, image encoder 100 encodes predetermined five slice segments SL0 to SL4 from the picture in the order of slice segments SL0, SL1, SL2, SL3, and SL4.

Furthermore, in the present embodiment, when encoding a slice segment, image encoder 100 sets the highest possible number of CTUs which can be assigned to a current slice segment, as an upper limit CTU count. Specifically, image encoder 100 sets, for a current slice segment, the highest possible number of CTUs as an upper limit CTU count, while securing CTUs of the minimum CTU count for each of slice segments of the default slice count.

For example, when image encoder 100 encodes slice segment SL0 which is encoded first in the encoding order, image encoder 100 subtracts the minimum CTU counts of slice segments SL1, SL2, SL3, and SL4 from the number of all the CTUs included in a picture. Image encoder 100 sets the value obtained by this subtraction as an upper limit CTU count for slice segment SL0. When image encoder 100 encodes slice segment SL1, image encoder 100 subtracts the number of CTUs included in slice segment SL0 already encoded and the minimum CTU counts of slice segments SL2, SL3, and SL4 from the number of all the CTUs included in the picture. Image encoder 100 sets the value obtained by this subtraction as an upper limit CTU count for slice segment SL1. Furthermore, image encoder 100 sets upper limit CTU counts also for slice segments SL2, SL3, and SL4 similarly to the above.

Accordingly, among a default slice count of slice segments included in a picture, the earlier a slice segment is encoded in the encoding order, the higher upper limit CTU count can be set for the slice segment. As a result, the higher the position of a region is in a picture, the larger slice segment is likely to be assigned. Stated differently, a background such as sky is shown as a monotonous image in an upper region of a picture of a landscape image, for instance, and does not include high-frequency components. Accordingly, the encoding amount for each CTU is low in such a region. As a result, the higher the upper limit CTU count is for such a region, the larger slice segment is for the region. Accordingly, the number of slice segments encoded in a picture can be appropriately reduced. On the other hand, the lower the position of a region is in a picture, the more slice segments the region can be split into. A complicated image is shown in a lower region of a picture of a landscape image, for instance, and includes many high-frequency components. Accordingly, the encoding amount of a lower region of a picture is likely to be higher than the encoding amount of an upper region, and many slice segments can be assigned to the lower region, thus inhibiting deterioration in image quality.

Figure 14:
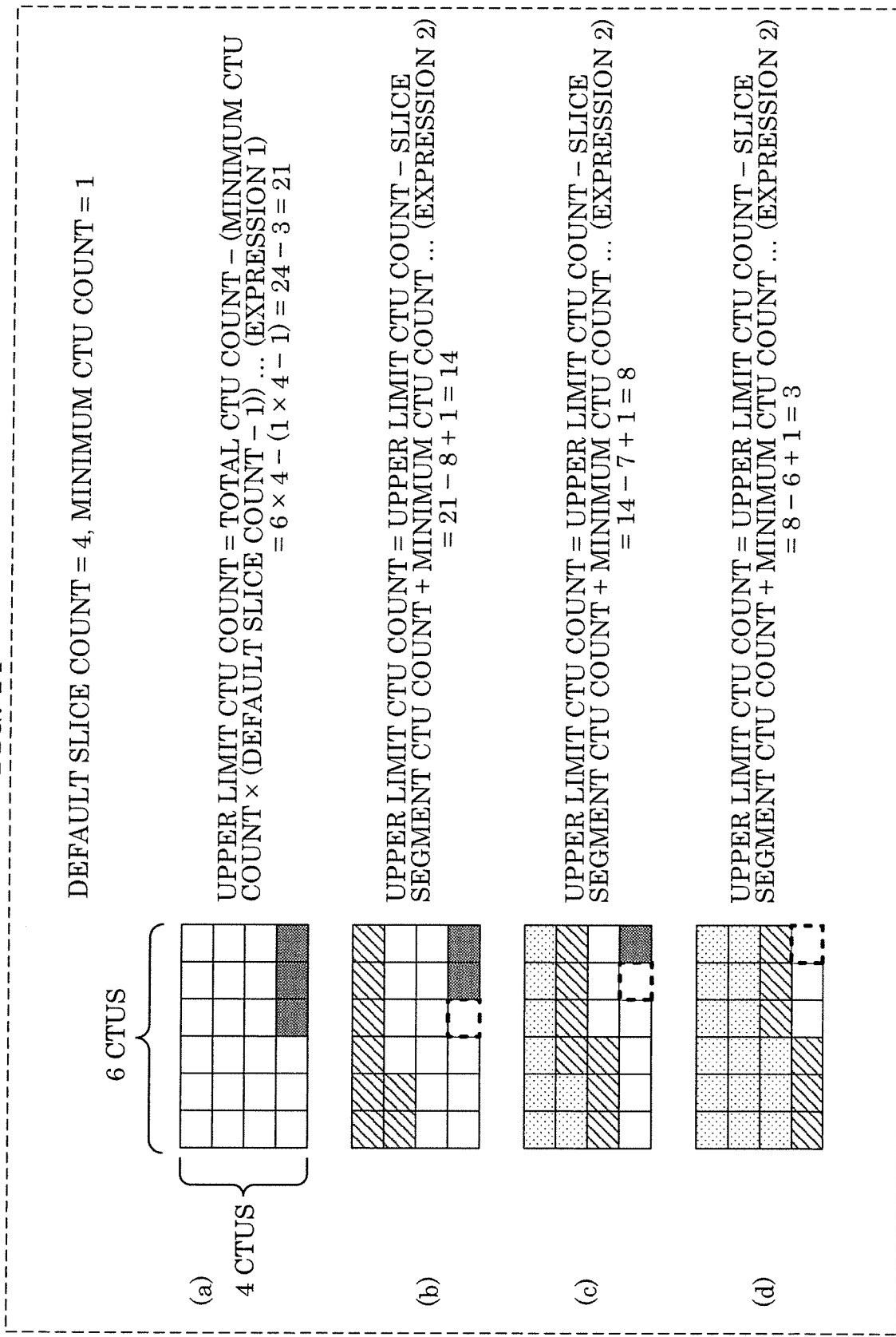
FIG. 14 illustrates examples in which the image encoder according to Embodiment 3 updates an upper limit coding tree unit (CTU) count.

FIG. 14 illustrates an example in which image encoder 100 according to the present embodiment updates the upper limit CTU count.

For example, image encoder 100 splits, into a default slice count of slice segments, a picture having a width of six CTUs and a height of four CTUs, as illustrated in FIG. 14. A default slice count is a predetermined number, and is 4, for example. The minimum CTU count of each slice segment is 1, for example.

In such a case, determiner 13 of image encoder 100 first calculates the upper limit CTU count for a slice segment encoded first in the encoding order, using "upper limit CTU count=total CTU count−(minimum CUT count×(default slice count−1)) . . . (Expression 1)" as illustrated in (a) of FIG. 14. Specifically, the total CTU count is 6×4 (CTUs), the minimum CTU count is 1, and the default slice count is 4. Accordingly, determiner 13 calculates the upper limit CTU count for the slice segment encoded first in the encoding order, in accordance with 6×4−(1×(4−1))=21. Note that the upper limit CTU count for the slice segment encoded first in the encoding order calculated in this manner is set as an initial value of the upper limit CTU count.

Next, determiner 13 updates the upper limit CTU count for the slice segment encoded second in the encoding order, using "upper limit CTU count=upper limit CTU count−slice segment CUT count+minimum CTU count . . . (Expression 2)" as illustrated in (b) of FIG. 14. Specifically, determiner 13 updates the upper limit CTU count before being updated which is calculated for the slice segment encoded immediately before in the encoding order, based on the slice segment CUT count and the minimum CTU count. The slice segment CTU count is the number of CTUs included in the slice segment encoded immediately before in the encoding order. Note that in the above case, the slice segment encoded immediately before in the encoding order is the slice segment encoded first in the encoding order. Specifically, the upper limit CTU count before being updated is 21, a slice segment CTU count is, for example, 8, and the minimum CTU count is 1. Accordingly, determiner 13 calculates the upper limit CTU count for the slice segment encoded second in the encoding order, in accordance with 21−8+1=14. Thus, determiner 13 updates the upper limit CTU count from 21 to 14.

Similarly, determiner 13 updates the upper limit CTU count for the slice segment encoded third in the encoding order, using (Expression 2) above, as illustrated in (c) of FIG. 14. Specifically, the upper limit CTU count before being updated is 14, the slice segment CTU count is, for example, 7, and the minimum CTU count is 1. Accordingly, determiner 13 calculates the upper limit CTU count for the slice segment encoded third in the encoding order, in accordance with 14−7+1=8. Namely, determiner 13 updates the upper limit CTU count from 14 to 8.

Similarly, determiner 13 updates the upper limit CTU count for the slice segment encoded fourth in the encoding order, using (Expression 2) above, as illustrated in (d) of FIG. 14. Specifically, the upper limit CTU count before being updated is 8, the slice segment CTU count is, for example, 6, and the minimum CTU count is 1. Accordingly, determiner 13 calculates the upper limit CTU count for the slice segment encoded fourth in the encoding order, in accordance with 8−6+1=3. Thus, determiner 13 updates the upper limit CTU count from 8 to 3.

Note that (Expression 1) and (Expression 2) above are for setting the highest possible number of CTUs as the upper limit CTU count for a current slice segment, while securing CTUs of the minimum CTU count for each of the slice segments of a default slice count.

Figure 15:
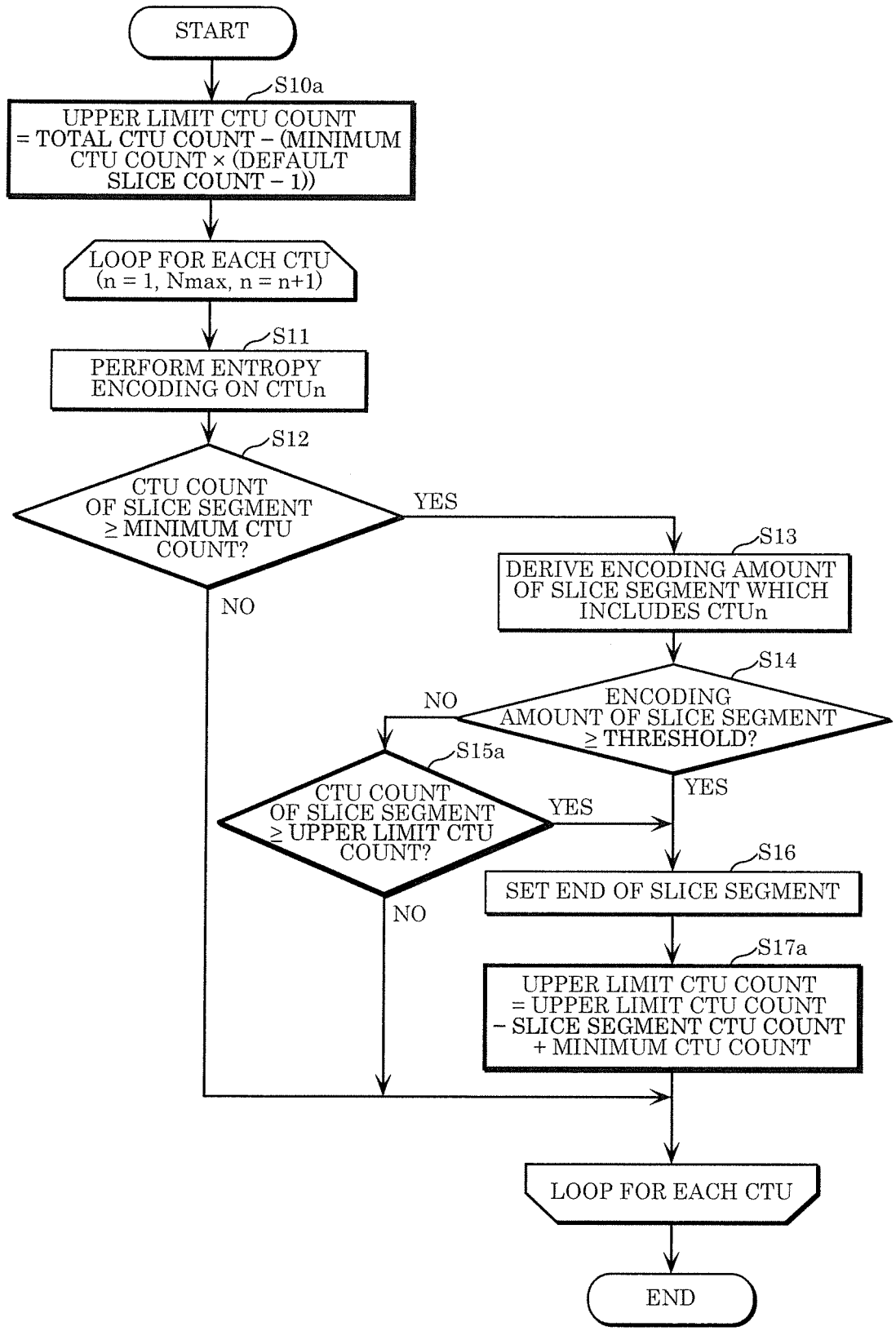
FIG. 15 is a flowchart illustrating an example of processing operation performed by an entropy encoder included in the image encoder according to Embodiment 3.

FIG. 15 is a flowchart illustrating an example of processing operation performed by entropy encoder 104 of image encoder 100 according to the present embodiment.

Entropy encoder 104 performs the process in step S10a illustrated in FIG. 15 on a picture, and next, sequentially performs processes in steps S11 to S17a on each of a plurality of CTUs included in the picture. Note that among the processes in steps S10a to S17a illustrated in FIG. 15, the same processes as those in the steps illustrated in FIG. 8 of Embodiment 1 are illustrated using the same signs as those in FIG. 8, and a detailed description thereof is omitted.

First, determiner 13 sets the number calculated using (Expression 1) above as an initial value of the upper limit CTU count (step S10a).

Then, encoding processor 11 performs entropy encoding on the current CTUn constituted by a coefficient sequence (step S11). Then, determiner 13 determines whether the CTU count which is the number of CTUs which are included in a current slice segment and on which entropy encoding has already been performed is at least the minimum CTU count (step S12).

Here, if determiner 13 determines that the CTU count is not at least the minimum CTU count (No in step S12), entropy encoder 104 repeats the processing from step S11.

On the other hand, if determiner 13 determines that the CTU count is at least the minimum CTU count (Yes in step S12), encoding amount deriver 12 derives the encoding amount of a current slice segment (step S13).

Then, determiner 13 determines whether the encoding amount of the current slice segment derived in step S13 is at least a threshold (step S14). Here, if determiner 13 determines that the encoding amount of the current slice segment is not at least the threshold (No in step S14), determiner 13 further determines whether the CTU count of the current slice segment is at least the upper limit CTU count (step S15a).

Here, if determiner 13 determines that the CTU count is not at least the upper limit CTU count (No in step S15a), entropy encoder 104 repeats the processing from step S11.

In step S14, if determiner 13 determines that the encoding amount of the current slice segment is at least the threshold (Yes in step S14), end setter 14 sets end information indicating the end of the current slice segment (step S16). Also when determiner 13 determines in step S15a that the CTU count is at least the upper limit CTU count (Yes in step S15a), end setter 14 sets end information indicating the end of the current slice segment (step S16).

The end of the current slice segment is defined by setting such end information. Specifically, a slice segment is generated, or in other words, encoded.

Then, after the process in step S16 is performed, determiner 13 updates the upper limit CTU count using (Expression 2) above (step S17a).

As described above, image encoder 100 according to the present embodiment sets the initial value of the upper limit block count, based on the default slice count which is a predetermined number of slice segments obtained from a picture. Then, in updating the upper limit block count, image encoder 100 updates the upper limit block count by adding a predetermined minimum block count to the value obtained by subtracting the slice segment block count from the upper limit block count before being updated. The initial value described above is the number of remaining blocks included in a picture when a minimum block count of one or more blocks among all the blocks included in the picture are assigned to each of one or more slice segments the number of which is less by 1 than the default slice count. Note that the above blocks are, for example, CTUs, the upper limit block count is, for example, an upper limit CTU count, and the slice segment block count is, for example, a slice segment CTU count.

Accordingly, when a plurality of slice segments are sequentially generated by setting end information, it is possible to increase, based on the initial value of the upper limit block count and the updated upper limit block count, a possibility that the earlier a slice segment is generated in the generation order, the higher the slice segment block count is.

For example, a plurality of slice segments included in a picture are sequentially generated from a slice segment located in the upper portion of the picture. In a picture of a landscape, for instance, sky is often shown in the upper region of the picture. Thus, in the region of a monotonous image such as where sky is shown, the encoding amounts of blocks are low, and thus the slice segment block count of a slice segment included in the region and generated earlier in the generation order can be increased. Accordingly, the number of slice segments included in an encoded picture can be decreased. As a result, when an encoded picture is transmitted on the per slice segment basis, a time for transmitting the picture is inhibited from being increased due to many slice segments.

The above is a description of an image encoding method, a transmission method, and an image encoder according to an aspect of the present disclosure, based on the embodiments and the variation, yet the present discloser is not limited to the above embodiments and variation.

For example, in the above embodiments and variation, when a picture is split into a plurality of slice segments, the picture includes one independent slice segment, but may include two or more independent slice segments. In this case, at least one dependent slice segment which depends on each of the two or more independent slice segments is also included in the picture. In each of the above embodiments and variation, a picture may be split into a plurality of slices, and the plurality of slices may be split into a plurality of slice segments.

For example, rate control for adjusting the compressibility of an image may be further performed by dynamically changing a quantization parameter. For example, when image encoder 100 encodes a slice segment, if the encoding amount of the slice segment is at least a threshold, image encoder 100 performs rate control so that the encoding amount per block of the subsequent slice segment may be low. Accordingly, the number of slice segments to be generated can be reduced.

In the above embodiments and variation, although the numerical value that is at most an MTU value is used as a threshold, image encoder 100 may obtain the MTU value used for transmitting a bitstream in any manner. For example, image encoder 100 obtains an MTU value, as described in the following.

[Example of Obtaining MTU Value]

Image encoder 100 may obtain an MTU value used for transmitting a bitstream, by handshaking when transmission control protocol (TCP) communication starts.

Figure 16:
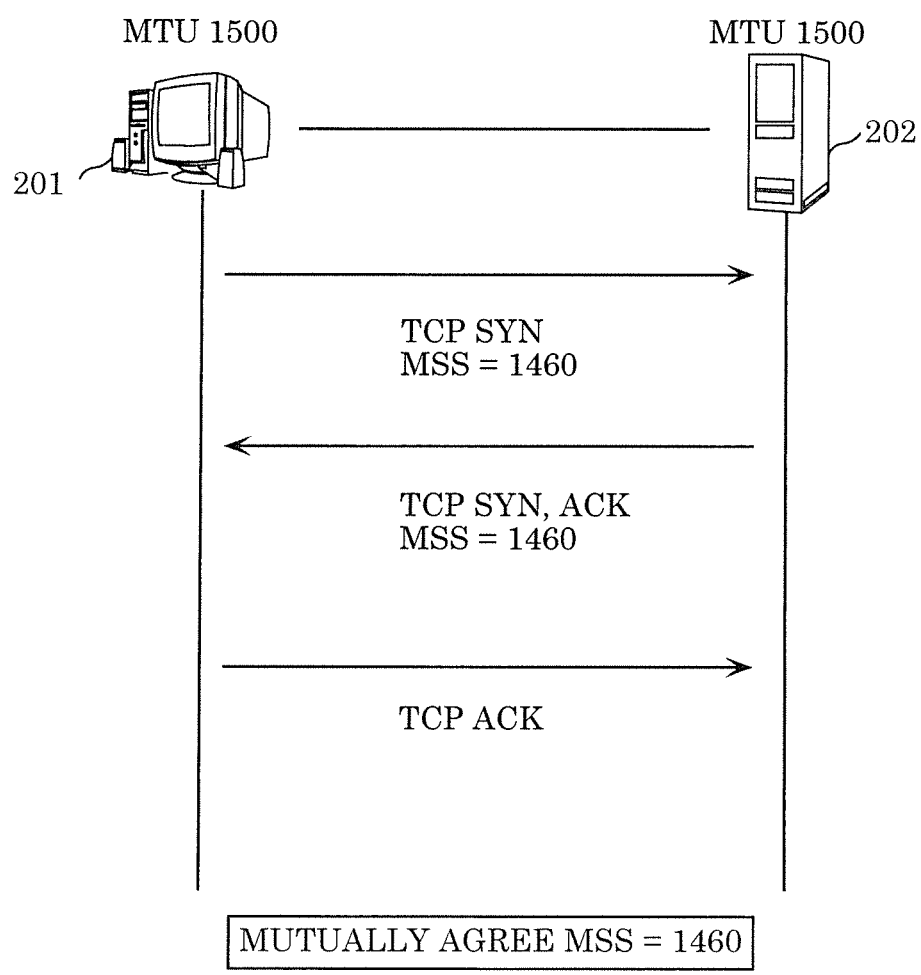
FIG. 16 illustrates an example in which a value of a maximum transmission unit (MTU) is obtained by handshaking when transmission control protocol (TCP) communication starts.

FIG. 16 illustrates an example in which an MTU value is obtained by handshaking when TCP communication starts.

For example, as illustrated in FIG. 16, terminal 201 which includes image encoder 100 communicates with terminal 202 using the TCP, and transmits a bitstream to terminal 202. In this case, when communication starts, terminals 201 and 202 notify each other of their maximum segment size (MSS) values by handshaking. Specifically, terminal 201 notifies terminal 202 of the MSS value of terminal 201, and terminal 202 notifies terminal 201 of the MSS value of terminal 202. An MSS value is a value obtained by subtracting the header size of the TCP from an MTU value, for example. Specifically, an MSS value is a value obtained by "MSS value=MTU value−40". In view of this, if the MTU values of terminal 201 and terminal 202 are 1500, terminals 201 and 202 notify each other of MSS value=1460. As a result, terminal 201 determines that the MSS value of terminal 201 is the same as the MSS value of terminal 202, and uses the MSS value for communication with terminal 202. Specifically, image encoder 100 of terminal 201 obtains the value resulting from adding 40 to the MSS value, as an MTU value used for transmitting a bitstream to terminal 202.

Alternatively, image encoder 100 may obtain the MTU value used for transmitting a bitstream by path MTU discovery. Note that path MTU discovery is specified in Request for Comments (RFC) 1191. Specifically, the handshaking when TCP communication starts as described above, image encoder 100 can obtain the MTU value of terminal 202, but cannot obtain the MTU value for transmission on the path between the terminals. However, image encoder 100 can obtain the lowest MTU value of the path by the path MTU discovery.

Figure 17:
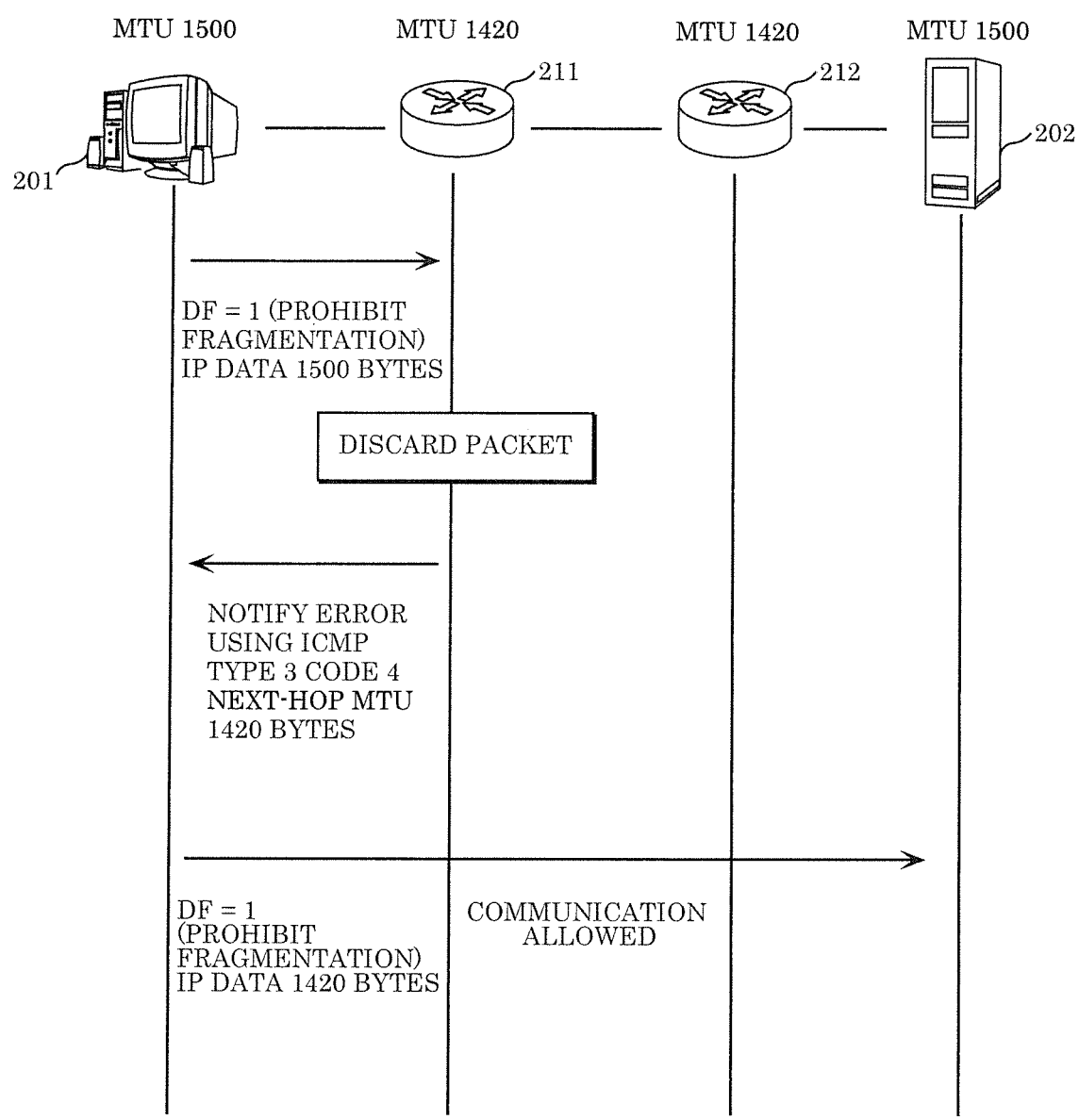
FIG. 17 illustrates an example in which an MTU is obtained by path MTU discovery.

FIG. 17 illustrates an example in which an MTU is obtained by path MTU discovery.

For example, as illustrated in FIG. 17, terminal 201 which includes image encoder 100 communicates with terminal 202 via routers 211 and 212, and transmits a bitstream to terminal 202. In this case, terminal 201 transmits a packet of 1500-byte IP data. At this time, terminal 201 sets Don't Fragment (DF) flag=1 in the packet. Note that DF flag=1 indicates prohibition of fragmentation of the packet. When router 211 on the path receives the packet, router 211 compares the packet and the MTU value of router 211. If the MTU value of router 211 is 1420 bytes, the amount of data of the packet exceeds the MTU value, and thus router 211 tries to split the packet. However, DF flag=1 is set in the packet, and thus router 211 cannot split the packet and discards the packet.

Then, router 211 notifies terminal 201 of the MTU value thereof using internet control message protocol (ICMP) Type 3, Code 4. Specifically, terminal 201 is notified of the 1420-byte MTU value. Terminal 201 which has received the notification retransmits a packet in which DF flag=1 is set. The packet retransmitted at this time includes IP data having 1420 bytes which is the notified MTU value. If the MTU value of router 212 is 1420 bytes, the retransmitted packet is transmitted to terminal 202 via routers 211 and 212. If the MTU value of router 212 is lower than 1420 bytes, similarly to the example of router 211 described above, terminal 201 retransmits a packet which does not exceed the MTU value of router 212. Accordingly, terminal 201 can obtain the lowest MTU value on the path between terminals 201 and 202.

In the above embodiments and variation, a terminal which includes image encoder 100 may perform handover. When the above MTU value obtained by the terminal changes due to the handover, image encoder 100 may reset a threshold according to the changed MTU value. For example, the terminal switches, by handover, from communication in accordance with the fiber distributed data interface (FDDI) standard to communication in accordance with the Ethernet (registered trademark) standard. At this time, image encoder 100 resets the threshold according to the MTU value for the standard after the switching. Specifically, image encoder 100 may reset the threshold when encoding a current picture ends and encoding the subsequent picture starts. Note that the MTU value is 1500 bytes according to Ethernet (registered trademark), whereas the MTU value is 4352 bytes according to FDDI. Accordingly, image encoder 100 resets the threshold from the value of at most 4352 bytes to a lower value of at most 1500 bytes when handover as in the above example is performed. Note that even when any standard or technology is used for communication, image encoder 100 may set a threshold according to the MTU value in accordance with the standard or technology. For example, the MTU value is 9180 bytes for "IP over ATM" which is technology of encapsulating an internet protocol (IP) packet and transmitting the packet over an asynchronous transfer mode (ATM) network. Image encoder 100 may set a threshold according to the MTU value.

Note that in the above embodiments and variation, each of the elements may be achieved by dedicated hardware, or may be obtained by executing a software program suitable for the element. Each element may be obtained by a program executor such as a CPU or a processor reading and executing a software program stored in a recording medium such as a hard disk or semiconductor memory. Here, the software which achieves the image encoder, for instance, according to the above embodiments and variation is a program which causes a computer to perform steps included in the flowcharts illustrated in FIGS. 8, 12, and 15.

Embodiment 4

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

[Usage Examples]

Figure 18:
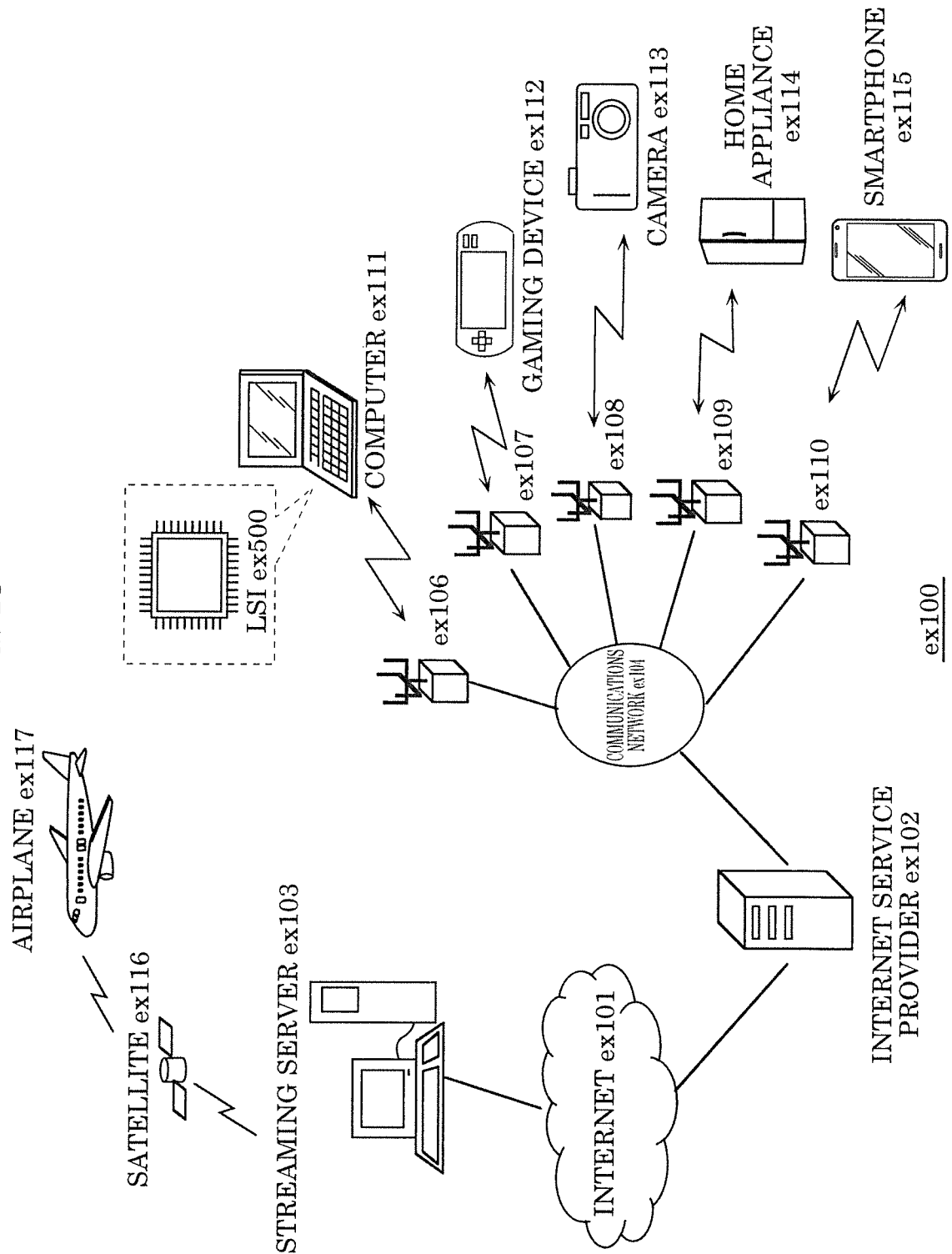
FIG. 18 illustrates an overall configuration of a content providing system for implementing a content distribution service.

FIG. 18 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 19:
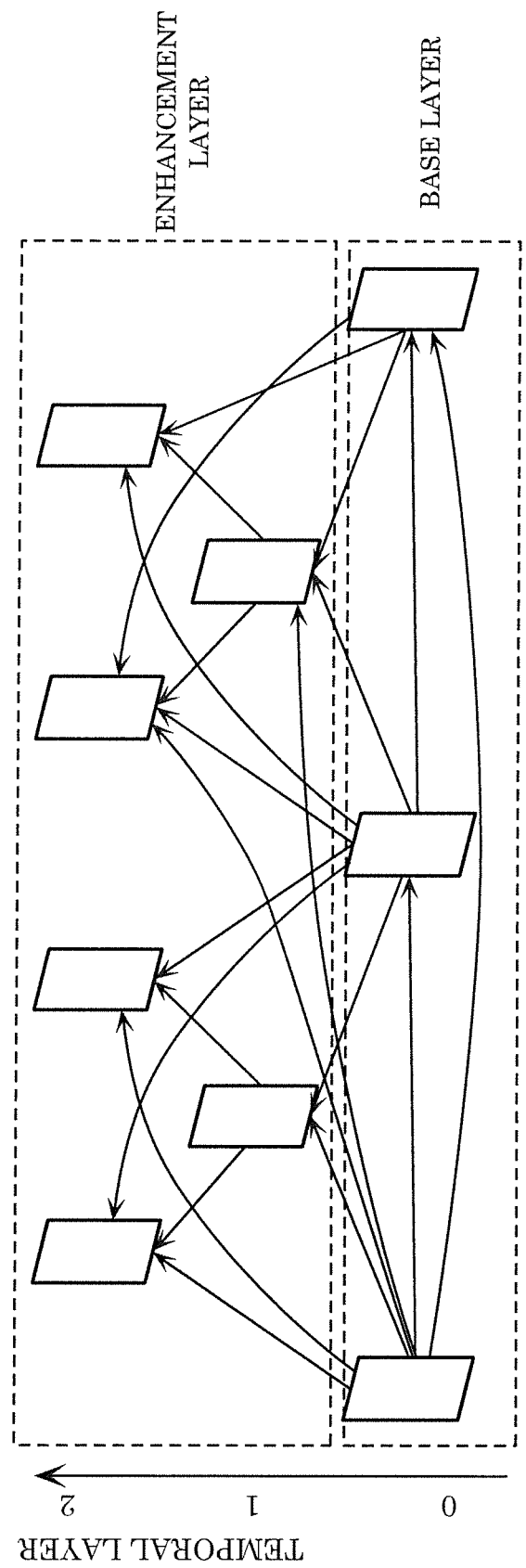
FIG. 19 illustrates one example of an encoding structure in scalable encoding.

The switching of content will be described with reference to a scalable stream, illustrated in FIG. 19, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 19. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 20:
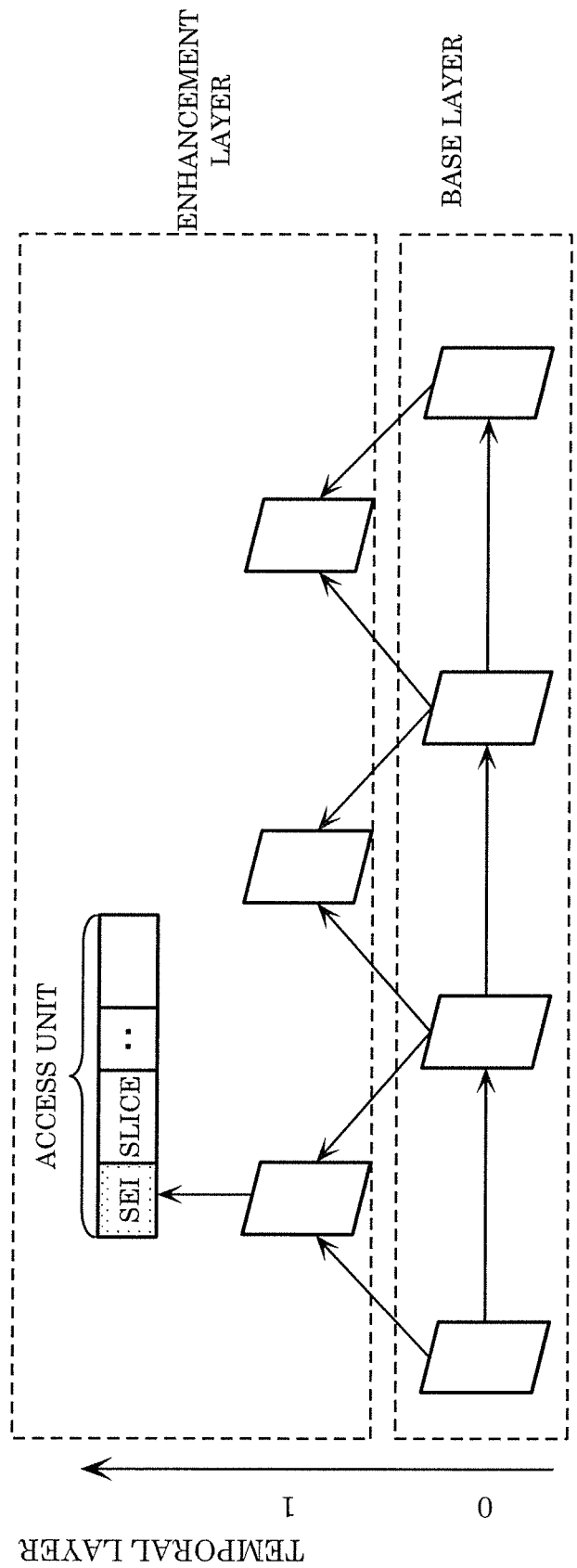
FIG. 20 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 20, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 21:
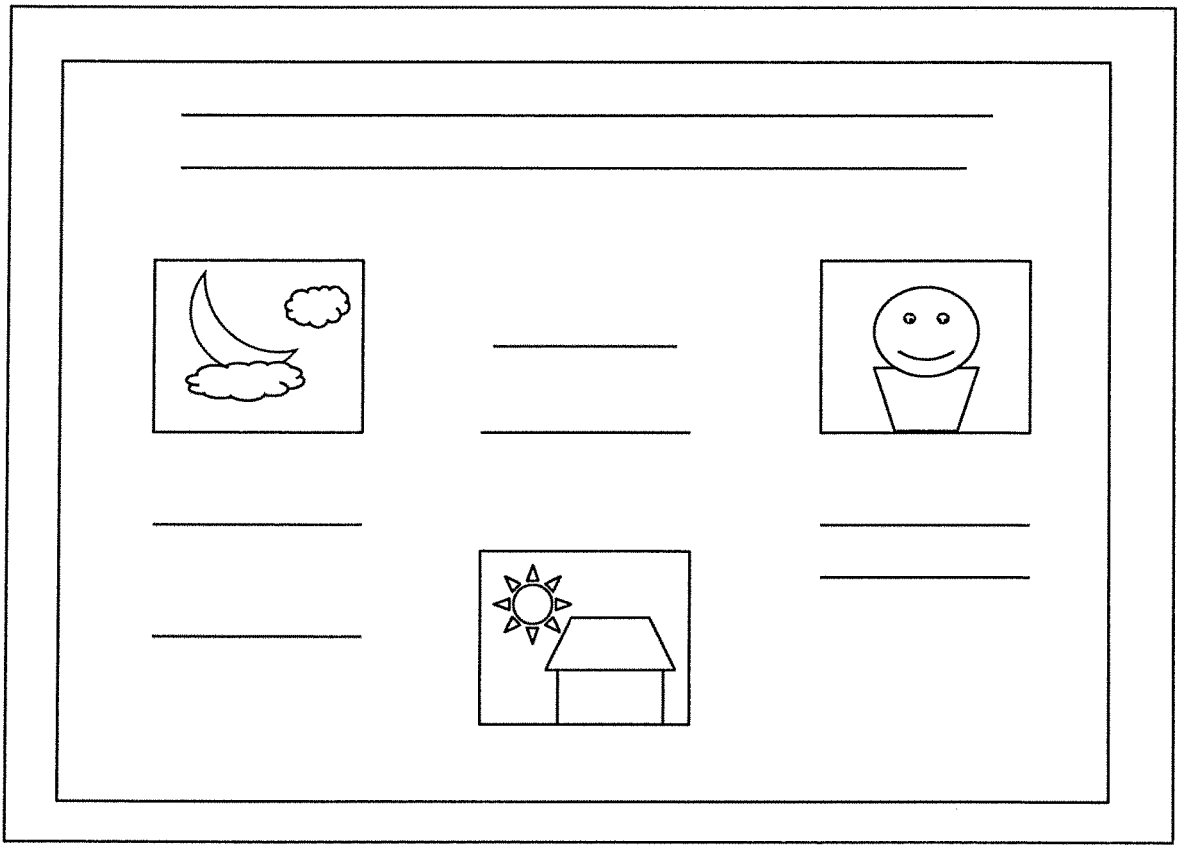
FIG. 21 illustrates an example of a display screen of a web page.
Figure 22:
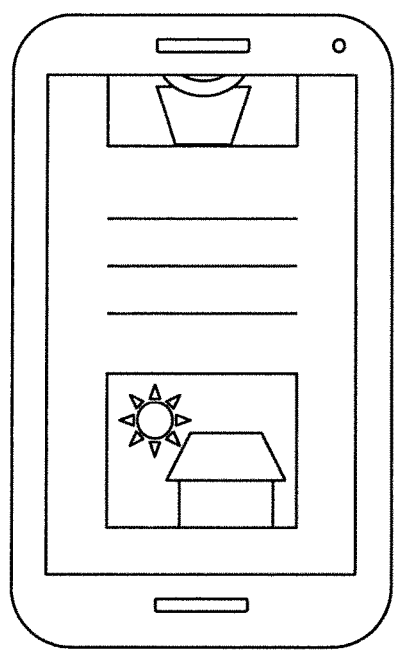
FIG. 22 illustrates an example of a display screen of a web page.

FIG. 21 illustrates an example of a display screen of a web page on, for example, computer ex111. FIG. 22 illustrates an example of a display screen of a web page on, for example, smartphone ex115. As illustrated in FIG. 21 and FIG. 22, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Usage Examples]

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 23:
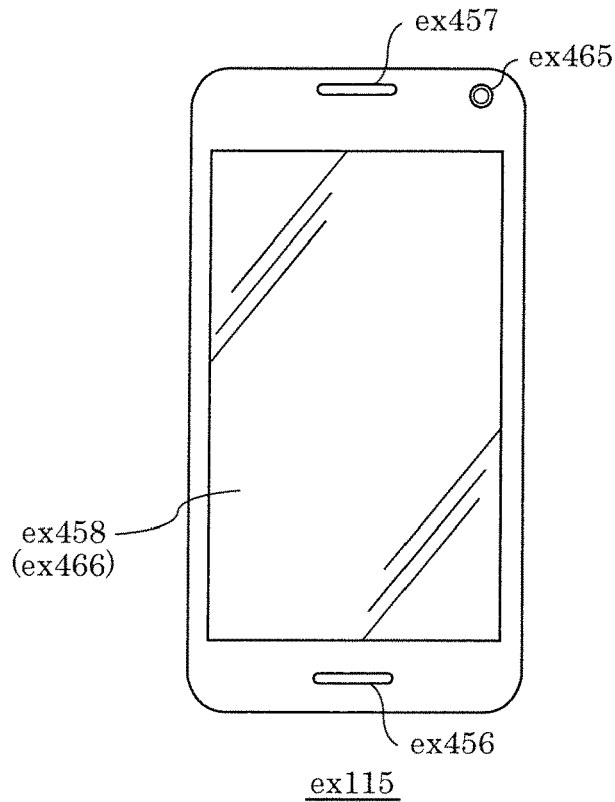
FIG. 23 illustrates one example of a smartphone.
Figure 24:
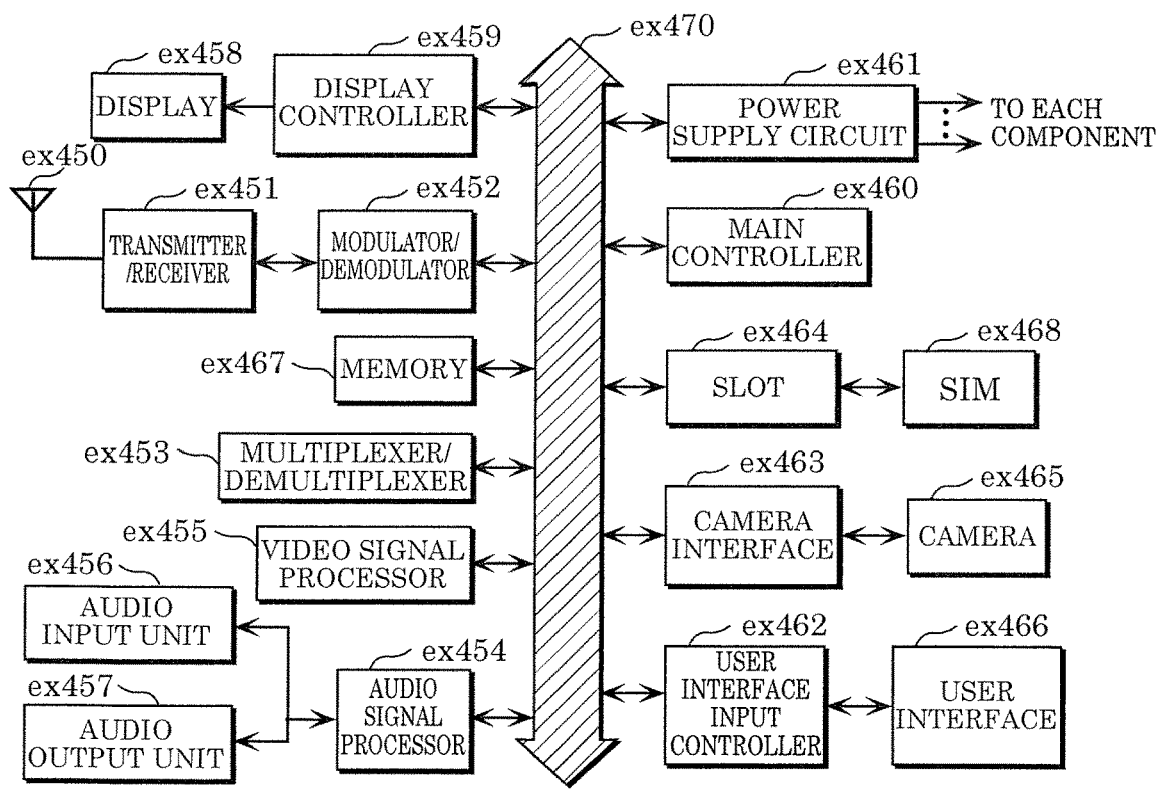
FIG. 24 is a block diagram illustrating a configuration example of a smartphone.

FIG. 23 illustrates smartphone ex115. FIG. 24 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although the above is a description of image encoding according to the present disclosure, for instance, based on the embodiments and variation, the present disclosure is not limited to these embodiments. Embodiments resulting from applying various modifications that may be conceived by those skilled in the art to the embodiments of the present disclosure, and embodiments resulting from combinations of elements in different embodiments may also be included within the scope of the present disclosure, as long as the resultant embodiments do not depart from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure yields advantageous effects that deterioration in processing performance for encoding is inhibited while improving transmission efficiency. The present disclosure is applicable to information display devices or imaging devices such as televisions, digital video recorders, car navigation systems, mobile phones, digital cameras, and digital video cameras, for example, and thus has a high utility value.

What is claimed is:

1. An image encoding method for generating a bitstream by encoding a picture, the image encoding method comprising:
   sequentially encoding blocks included in the picture;
   deriving an encoding amount of a slice segment each time one of the blocks is encoded as a current block, the slice segment including the current block;
   determining whether the derived encoding amount is greater than or equal to a threshold;
   when the derived encoding amount is determined to be greater than or equal to the threshold, setting end information indicating an end of the slice segment in a position in the bitstream, the position corresponding to the current block encoded;
   setting a default block count which is a predetermined number, as an initial value of an upper limit block count indicating an upper limit of the number of encoded blocks in the slice segment;
   when the derived encoding amount is determined to be less than the threshold, determining whether the number of encoded blocks included in the slice segment is greater than or equal to the upper limit block count; and
   when the number of the encoded blocks is determined to be greater than or equal to the upper limit block count, (i) setting the end information indicating the end of the slice segment in the position in the bitstream and (ii) updating the upper limit block count, which has been compared to the number of encoded blocks included in the slice segment, to increase the upper limit block count by adding the default block count to a value obtained by subtracting (a) a slice segment block count which is the number of the encoded blocks included in the slice segment the end of which is indicated by the end information from (b) the upper limit block count before being updated.

2. The image encoding method according to claim 1, wherein
   the slice segment is one of an independent slice segment and at least one dependent slice segment which depends on the independent slice segment, the independent slice segment and the at least one dependent slice segment being included in a slice included in the picture.

3. The image encoding method according to claim 1, wherein
   the threshold is a numerical value less than or equal to a size of a packet used for network transmission of the bitstream.

4. The image encoding method according to claim 1, further comprising:
   determining whether the number of encoded blocks included in the slice segment the encoding amount of which has been derived among the blocks is greater than or equal to a minimum block count predetermined,
   wherein
   in the determining whether the derived encoding amount is greater than or equal to the threshold,
      the derived encoding amount is determined to be greater than or equal to the threshold when the number of the encoded blocks is greater than or equal to the minimum block count.

5. The image encoding method according to claim 1, further comprising:
   when the derived encoding amount is determined to be less than the threshold, determining whether the number of encoded blocks included in the slice segment the encoding amount of which has been derived among the blocks is greater than or equal to a predetermined maximum block count; and
   when the number of the encoded blocks is determined to be greater than or equal to the predetermined maximum block count, setting the end information indicating the end of the slice segment in the position in the bitstream.

6. The image encoding method according to claim 1, wherein sequentially encoding the blocks includes binarization and arithmetic encoding, and in the deriving the encoding amount of the slice segment, the encoding amount of the slice segment is derived using an amount of binarized data of the current block on which the binarization has been performed and the arithmetic encoding has not been performed yet.

7. The image encoding method according to claim 6, wherein in the deriving the encoding amount of the slice segment, an encoding amount of the current block on which the arithmetic encoding has been performed is estimated from the amount of the binarized data, and the encoding amount of the slice segment is derived using the estimated encoding amount of the current block.

8. An image encoding method for generating a bitstream by encoding a picture, the image encoding method comprising:

encoding blocks included in the picture;

deriving an encoding amount of a slice segment which includes a current block among the blocks;

determining whether the derived encoding amount is greater than or equal to a threshold;

when the derived encoding amount is determined to be greater than or equal to the threshold, setting end information indicating an end of the slice segment in a position in the bitstream, the position corresponding to the current block encoded;

setting a default block count which is a predetermined number, as an initial value of an upper limit block count indicating an upper limit of the number of encoded blocks in the slice segment;

when the derived encoding amount is determined to be less than the threshold, determining whether the number of encoded blocks is greater than or equal to the upper limit block count; and when the number of the encoded blocks is determined to be greater than or equal to the upper limit block count, (i) setting the end information indicating the end of the slice segment in the position in the bitstream and (ii) updating the upper limit block count, which has been compared to the number of encoded blocks included in the slice segment, to increase the upper limit block count by adding the default block count to a value obtained by subtracting (a) a slice segment block count which is the number of the encoded blocks included in the slice segment the end of which is indicated by the end information from (b) the upper limit block count before being updated.

9. A transmission method for transmitting a bitstream generated by encoding a picture, the transmission method comprising:

sequentially encoding blocks included in the picture;

deriving an encoding amount of a slice segment each time one of the blocks is encoded as a current block, the slice segment including the current block;

determining whether the derived encoding amount is greater than or equal to a threshold;

when the derived encoding amount is determined to be greater than or equal to the threshold, setting end information indicating an end of the slice segment in a position in the bitstream, the position corresponding to the current block encoded;

setting a default block count which is a predetermined number, as an initial value of an upper limit block count indicating an upper limit of the number of encoded blocks in the slice segment;

when the derived encoding amount is determined to be less than the threshold, determining whether the number of encoded blocks included in the slice segment is greater than or equal to the upper limit block count indicating an upper limit of the number of encoded blocks in the slice segment;

when the number of the encoded blocks is determined to be greater than or equal to the upper limit block count, (i) setting the end information indicating the end of the slice segment in the position in the bitstream and (ii) updating the upper limit block count, which has been compared to the number of encoded blocks included in the slice segment, to increase the upper limit block count by adding the default block count to a value obtained by subtracting (a) a slice segment block count which is the number of the encoded blocks included in the slice segment the end of which is indicated by the end information from (b) the upper limit block count before being updated; and storing and transmitting, in a packet, the slice segment for which the end information has been set.

10. An image encoder which generates a bitstream by encoding a picture, the image encoder comprising:

processing circuitry; and storage accessible from the processing circuitry, wherein using the storage, the processing circuitry:

sequentially encodes blocks included in the picture;

derives an encoding amount of a slice segment each time one of the blocks is encoded as a current block, the slice segment including the current block;

determines whether the derived encoding amount is greater than or equal to a threshold;

when the derived encoding amount is determined to be greater than or equal to the threshold, sets end information indicating an end of the slice segment in a position in the bitstream, the position corresponding to the current block encoded;

setting a default block count which is a predetermined number, as an initial value of an upper limit block count indicating an upper limit of the number of encoded blocks in the slice segment;

when the derived encoding amount is determined to be less than the threshold, determining whether the number of encoded blocks included in the slice segment is greater than or equal to the upper limit block count; and when the number of the encoded blocks is determined to be greater than or equal to the upper limit block count, (i) setting the end information indicating the end of the slice segment in the position in the bitstream and (ii) updating the upper limit block count, which has been compared to the number of encoded blocks included in the slice segment, to increase the upper limit block count by adding the default block count to a value obtained by subtracting (a) a slice segment block count which is the number of the encoded blocks included in the slice segment the end of which is indicated by the end information from (b) the upper limit block count before being updated.

\* \* \* \* \*